US012734872B2

(12) United States Patent
Kumagai

(10) Patent No.: US 12,734,872 B2
(45) Date of Patent: Sep. 15, 2026

(54) SUPPORT DEVICE FOR VEHICULAR BATTERY PACK AND ELECTRIC TRUCK

(71) Applicant: Daimler Truck AG, Leinfelden-Echterdingen (DE)

(72) Inventor: Naotatsu Kumagai, Kawasaki (JP)

(73) Assignee: Daimler Truck AG, Leinfelden-Echterdingen (DE)

(*) Notice: Subject to any disclaimer, the term of this patent is extended or adjusted under 35 U.S.C. 154(b) by 227 days.

(21) Appl. No.: 18/573,345

(22) PCT Filed: Mar. 28, 2022

(86) PCT No.: PCT/JP2022/015160

§ 371 (c)(1),
(2) Date: Dec. 21, 2023

(87) PCT Pub. No.: WO2023/276375

PCT Pub. Date: Jan. 5, 2023

(65) Prior Publication Data

US 2024/0286480 A1 Aug. 29, 2024

(30) Foreign Application Priority Data

Jun. 30, 2021 (JP) ................................ 2021-108463

(51) Int. Cl.
*B60K 1/04* (2019.01)
*B60L 50/60* (2019.01)
(Continued)

(52) U.S. Cl.
CPC ................ *B60K 1/04* (2013.01); *B60L 50/66* (2019.02); *H01M 50/242* (2021.01);
(Continued)

(58) Field of Classification Search
CPC ... B60K 1/04; B60K 2001/0438; B60L 50/66; H01M 50/249; H01M 50/242; H01M 50/202
See application file for complete search history.

(56) References Cited

U.S. PATENT DOCUMENTS

| | | | |
|---|---|---|---|
| 10,493,837 | B1 | 12/2019 | Angelo et al. |
| 2019/0181398 | A1 | 6/2019 | Shimada |
| 2021/0362579 | A1 | 11/2021 | Kumagai |

FOREIGN PATENT DOCUMENTS

| | | | |
|---|---|---|---|
| AU | 2019200049 | A1 | 4/2020 |
| BR | 102019000180 | A2 | 4/2020 |

(Continued)

OTHER PUBLICATIONS

International Preliminary Report on Patentability (PCT/IB/373) and Written Opinion (PCT/ISA/237) issued in PCT Application No. PCT/JP2022/015160 dated Dec. 14, 2023 (5 pages).

(Continued)

*Primary Examiner* — Huan Le
(74) *Attorney, Agent, or Firm* — Crowell & Moring LLP

(57) ABSTRACT

A support device for a vehicular battery pack that is mounted under side rails constituting a ladder frame of a vehicle and that includes a pair of battery side-faces each of which faces outward in a vehicle width direction and is located outside in the vehicle width direction further than the side rails. The support device includes a battery-side bracket that includes an opposing plate facing one of the battery side-faces and receives the vehicular battery pack. A frame-side bracket couples the battery-side bracket to one of the side rails. A patterned opening unit is provided with a plurality of holes formed on the opposing plate of the battery-side bracket and mounts an on-board device on the battery-side bracket via at (Continued)

least one of the plurality of holes, the plurality of holes being arranged in a predetermined pattern.

4 Claims, 12 Drawing Sheets

(51) Int. Cl.
*H01M 50/242* (2021.01)
*H01M 50/249* (2021.01)

(52) U.S. Cl.
CPC ... *H01M 50/249* (2021.01); *B60K 2001/0438* (2013.01); *H01M 2220/20* (2013.01)

(56) References Cited

FOREIGN PATENT DOCUMENTS

| | | | |
|---|---|---|---|
| CA | 3 028 808 | A1 | 4/2020 |
| CN | 102582457 | A | 7/2012 |
| CN | 204323022 | U | 5/2015 |
| CN | 204488460 | U | 7/2015 |
| CN | 208028111 | U | 10/2018 |
| CN | 109950437 | A | 6/2019 |
| CN | 112292278 | A | 1/2021 |
| JP | 2-66324 | U | 5/1990 |
| JP | 2016-113063 | A | 6/2016 |
| MX | 2019000281 | A | 9/2019 |
| WO | WO 2020/003835 | A1 | 1/2020 |

OTHER PUBLICATIONS

English-language Extended European Search Report issued in European Application No. 22832536.1-1009 dated Jul. 17, 2024 (7 pages).
International Search Report (PCT/ISA/210) issued in PCT Application No. PCT/JP2022/015160 dated Jun. 7, 2022 (2 pages).
Chinese-language Office Action issued in Chinese Application No. 202280043254.4 dated Mar. 16, 2026 with partial English translation (13 pages).

SUPPORT DEVICE FOR VEHICULAR BATTERY PACK AND ELECTRIC TRUCK

TECHNICAL FIELD

This disclosure is related to a support device that supports a vehicular battery pack and an electric truck that includes the support device.

BACKGROUND ART

Conventionally, from a viewpoint of reducing environmental loads, electric-powered vehicles, such as electric vehicles or hybrid vehicles, have been developed, which travel by supplying electric power of a battery for driving to a motor. In recent years, electric-powered vehicles have also been developed in the field of commercial vehicles such as trucks (see, for example, Patent Document 1). From the aspect of cost reduction, general-purpose battery packs usable in passenger cars have been considered to be applied to the electric-powered commercial vehicles.

CITATION LIST

Patent Literature

[Patent Document 1] JP 2016-113063 A

SUMMARY OF INVENTION

Technical Problem

However, since a battery pack for a passenger car is assumed to be mounted inside a vehicle body, there has been a problem that a casing of the battery pack has a relatively low load bearing strength. On the other hand, in a commercial vehicle such as a truck, a high impact load may be applied to the battery pack arranged under a ladder frame in the event of a side collision, which raises a need for a high load bearing strength in a support device that supports the battery pack.

In a typical vehicle provided with a ladder frame, spaces on the sides (outside in a vehicle width direction) of the ladder frame between the wheelbase are used as mounting spaces for various on-board devices such as a low-voltage battery and a side sensor. In contrast, when the battery pack is arranged under the ladder frame, the mounting spaces for the on-board devices are reduced due to the battery pack, so that the mountability of such on-board devices may be lowered.

Note that the physical size of the battery pack is determined according to the maximum charging capacity required for the vehicle, the shapes of battery cells, and the like, and may be designed to protrude outward in the vehicle width direction further than the ladder frame. This raises, for the safety of the battery pack against a side collision, the necessity to use a relatively rigid metal such as steel for a further increase in the stiffness of the support device and/or the necessity to increase the thickness of a member covering the battery pack. As a consequence, the total weight of the support device will be increased, which may adversely affect the cruising range and the load capacity of the electric truck.

The present disclosure has been devised in view of the foregoing problems, and one of the objects of the present disclosure is to provide a support device for a vehicular battery pack and an electric truck that are able to improve the mountability of an on-board device while enhancing the protectability of the vehicular battery pack in case of a side collision and also to suppress a weight increase of the support device.

Solution to Problem

The present disclosure has been developed in order to solve at least part of the above problems, and can be achieved in the form of the following embodiments or application examples.

(1) A support device for a vehicular battery pack according to this application example is for a vehicular battery pack that is mounted under side rails constituting a ladder frame of a vehicle and that includes a pair of battery side-faces each of which faces outward in a vehicle width direction and is located outside in the vehicle width direction further than the side rails. The support device includes: a battery-side bracket that includes an opposing plate facing one of the battery side-faces and receives the vehicular battery pack; a frame-side bracket that couples the battery-side bracket to one of the side rails; and a patterned opening unit that is provided with a plurality of holes formed on the opposing plate of the battery-side bracket and mounts an on-board device on the battery-side bracket via at least one of the plurality of holes. The plurality of holes is arranged in a predetermined pattern.

With such a support device for the vehicular battery pack, since the impact load applied from the outside in the vehicle width direction in case of a side collision is input into the on-board device before being input into the battery-side bracket, the initial input of the impact load is absorbed by the on-board device. This reduces the impact load to be transmitted to the battery-side bracket, consequently also reducing the impact load to be transmitted to the vehicular battery pack through the battery-side bracket. Thus, the protectability of the vehicular battery pack in a side collision can be enhanced. Further, the opposing plate of the battery-side bracket is provided with the patterned opening unit in which multiple holes are formed. This ensures a mounting space for the on-board device and improves the mountability of the on-board device. Furthermore, since the weight of the battery-side bracket is reduced by an amount of the multiple holes, it is possible to suppress the weight increase of the support device.

(2) In the support device according to this application example, the plurality of holes may be arranged to have a vertical line of symmetry in a side view of the battery-side bracket.

The arrangement of the multiple holes in a vertical line of symmetry can smooth out the stiffness distribution in a left-right direction (vehicle front-rear direction) in the side view of the battery-side bracket, and can make the stiffness distribution substantially uniform, for example. Therefore, the protectability of the vehicular battery pack can be further enhanced.

(3) In the support device according to this application example, the plurality of holes may be arranged to have a horizontal line of symmetry in a side view of the battery-side bracket.

The arrangement of the multiple holes in a horizontal line of symmetry can smooth out the stiffness distribution in a vertical direction in the side view of the battery-side bracket, and can make the stiffness distribution substantially uniform, for example. Therefore, the protectability of the vehicular battery pack can be further enhanced.

(4) In the support device according to this application example, the plurality of holes may be arranged in a planar grid pattern.

Examples of the planar grid pattern here include a square grid pattern, a rectangular grid pattern, and a diagonal grid pattern. According to an arrangement of the multiple holes in the planar grid pattern, the mounting position of the on-board device can be easily changed, which can enhance versatility. Further, this configuration allows multiple on-board devices to be easily mounted, so that the mountability of the on-board devices can be further improved.

(5) In the support device according to this application example: one of the side rails may have a hole pattern formed on a web face; and an arrangement of the plurality of holes may correspond to the hole pattern.

The arrangement of the multiple holes may be a layout that matches part of the hole pattern (partial match) or may be a layout that matches the entire hole pattern (complete match). Matching the arrangement of the multiple holes with the hole pattern makes it possible to easily move the on-board device conforming to the hole pattern of the side rail to the battery-side bracket. Thus, the mounting compatibility of the on-board device can be maintained and the usability (convenience for vehicle users) can be enhanced.

(6) In the support device according to this application example, an arrangement of the plurality of holes may correspond to the hole pattern formed on a portion of a web face of the side rail. The portion may be located vertically above the vehicular battery pack.

Such an arrangement of the holes allows the mounting position of the on-board device in a vehicle length direction to be substantially identical in the vehicle equipped with the vehicular battery pack and in a vehicle not equipped with the vehicular battery pack.

(7) In the support device according to this application example, an arrangement pitch of the plurality of holes may be set to an integral multiple of an arrangement pitch of the hole pattern.

With such setting of the arrangement pitch, the mounting compatibility of the on-board device can be maintained to some degree, and the usability can be enhanced.

(8) In the support device according to this application example, the opposing plate may be formed into a wavy shape by alternately arranging a convex part and a recess part. The convex part may protrude outward in the vehicle width direction and may have the plurality of holes formed therethrough. The recess part may be located inside in the vehicle width direction from the convex part.

By providing the convex part and the recess part on the opposing plate and forming the multiple holes through the convex part, it is possible to reduce the board thickness of the opposing plate and to ensure the strength against a side collision while reducing the weight. In addition, forming the holes on the convex part makes it possible to dispose fastening devices inserted into the holes at a farther distance from the vehicular battery pack, so that the vehicular battery pack can be prevented from deformation and damage that may be caused by a contact with the fastening devices.

(9) In the support device according to this application example: the opposing plate may be an extrusion material including a hollow extending in a vehicle length direction; and the plurality of holes may be provided so as to penetrate the opposing plate from the hollow to an outside in the vehicle width direction.

By using the extrusion material including the hollow as the opposing plate, the hollow part can function as a crushable zone in the event of a side collision, which can ensure the strength against a side collision while reducing the weight. In addition, providing the multiple holes so as to penetrate from the inner part of the hollow to the outside in the vehicle width direction makes it possible to dispose the on-board device at a farther distance from the vehicular battery pack, so that the vehicular battery pack can be prevented from deformation and damage.

(10) An electric truck according to this application example includes the support device for the vehicular battery pack defined in any one of the above (1)-(9).

Like the above (1), this configuration can improve the mountability of an on-board device while enhancing the protectability of the vehicular battery pack in case of a side collision, and also can suppress the weight increase of the support device.

(11) In the electric truck according to this application example, the on-board device may include a casing provided with a charging opening through which the vehicular battery pack is charged from outside.

In the electric truck equipped with such a casing, the charging opening of the casing can be easily arranged on the outside in the vehicle width direction as compared with a structure that mounts the casing on the side rail. This makes it possible to arrange the casing at a predetermined position without extending a dedicated bracket for arranging the casing at the predetermined position from the side rail, so that the workability of supplying electricity to the charging opening can be ensured while reducing the number of components and simplifying the structure.

(12) In the electric truck according to this application example, the on-board device may include a sensor that detects an object located outside in the vehicle width direction.

In the electric truck with such a sensor, the sensor can be easily arranged on the outside in the vehicle width direction as compared with a structure that mounts the sensor on the side rail. This makes it possible to arrange the sensor at a predetermined position without extending a dedicated bracket for arranging the sensor at the predetermined position from the side rail, so that the detection area of the sensor can be appropriately set while reducing the number of components and simplifying the structure.

(13) In the electric truck according to this application example, the on-board device may include a mounting device to be built into the vehicle or an accessory device of the mounting device.

Examples of the mounting device may include a CIB (Charge Inlet Box) apparatus, a vehicle side object sensing sensor (radar, camera) that is provided to prevent entanglement, a refrigerating and freezing apparatus, a power generation apparatus, a lighting apparatus, a water supply apparatus, a shredder apparatus, a waste storage apparatus, and a crane apparatus. Examples of the accessory device may include a motor, a compressor, a pump, a wiring material, a plumbing material, a toolbox, and auxiliary equipment. By making the mounting device or the accessory device mountable on the battery-side bracket, the mounting device or the accessory device can be mounted at the substantially same positions as in, for example, an existent vehicle without the vehicular battery pack, so that the convenience and usability of the vehicle can be further enhanced.

Advantageous Effects of Invention

According to the present disclosure, it is possible to improve the mountability of the on-board device while enhancing the protectability of the vehicular battery pack in case of a side collision, and also to suppress the weight increase of the support device.

DESCRIPTION OF EMBODIMENTS

Figure 1:
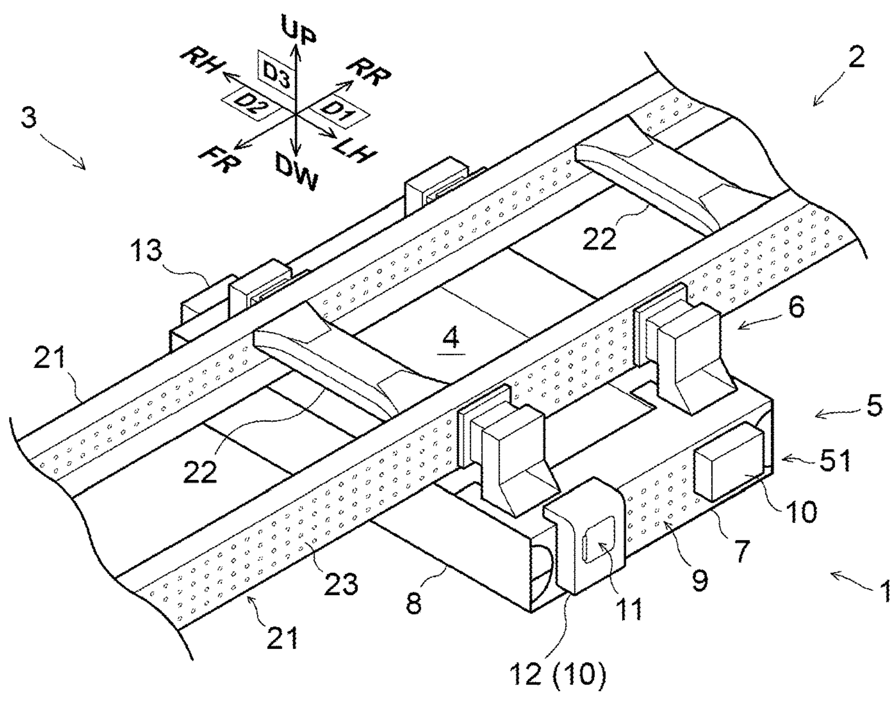
FIG. 1 is a perspective view of a support device for a vehicular battery pack according to a first embodiment.

Referring to the drawings, embodiments (a first embodiment, a second embodiment, and a third embodiment) of the present disclosure will now be described. The following embodiments are illustrative only and are not intended to preclude the application of various modifications and techniques not explicitly set forth therein. The configurations of the following embodiments may be variously modified and implemented without departing from the scope thereof. Also, the configurations can be selected as necessary, or can be combined in an appropriate manner.

1. First Embodiment

[1-1. Overall Configuration]

As shown in FIG. 1, a support device 1 for a vehicular battery pack (hereinafter, simply referred to as a support device 1) according to the first embodiment is mounted on an electric truck (vehicle) 3 provided with a ladder frame 2. The electric truck 3 is an electric-powered vehicle (electric vehicle, hybrid vehicle) that travels by supplying electric power of a battery pack 4 (vehicular battery pack) for driving to a non-illustrated motor.

Hereinafter, the front-rear direction of the electric truck 3 is also referred to as a vehicle length direction D1, and the left-light direction of the electric truck 3 is also referred to as a vehicle width direction D2. A vertical (up-down) direction orthogonal to both the front-rear direction and the left-right direction is also referred to as a vehicle height direction D3. In the drawings, the front side is indicated by “FR”; the rear side is indicated by “RR”; the left side is indicated by “LH”; the right side is indicated by “RH”; the upper side is indicated by “UP”; and the lower side is indicated by “DW”. Incidentally, FIG. 1 shows a lower structure of the electric truck 3, but omits an upper structure (body) disposed on the ladder frame 2.

The ladder frame 2 is a component which forms a skeleton of the electric truck 3 and has high stiffness and strength. The ladder frame 2 includes a pair of side rails 21 extending in the vehicle length direction D1, and multiple cross members 22 extending in the vehicle width direction D2 to connect the side rails 21 to each other.

The pair of side rails 21 are arranged apart from each other in the vehicle width direction D2. Each side rail 21 has a channel shape (U-shaped cross section) in which a pair of plate-like flange portions extends inward in the vehicle width direction D2 from the upper and the lower edges of a plate-like web portion extending along the vehicle length direction D1 and the vehicle height direction D3.

The multiple cross members 22 are disposed apart from each other in the vehicle length direction D1. Here, two cross members 22 are illustrated, which are respectively disposed at two positions of: a position overlapping the battery pack 4 in the vehicle height direction D3; and a position on the rear side of the battery pack 4.

The battery pack 4 is, for example, a general-purpose high-voltage battery pack usable in a passenger car. In the electric truck 3, the battery pack 4 is mounted under the pair of side rails 21 and protrudes outward in the vehicle width D2 further than the side rails 21. Here, the illustrated battery pack 4 has a box shape having a dimension in the vehicle height direction D3 smaller (thinner) than the dimension in the vehicle length direction D1 and the dimension in the vehicle width direction D2. However, the shape of the battery pack 4 is not particularly limited.

The battery pack 4 has a pair of battery side-faces 41 facing outward in the vehicle width direction D2. The pair of battery side-faces 41 are respectively positioned on outsides in the vehicle width direction D2 further than the pair of side rails 21. More specifically, the right battery side-face 41 is positioned on the right side of the right side rail 21 and the left battery side-face 41 is positioned on the left side of the left side rail 21.

Since the battery side-faces 41 are arranged outside in the vehicle width direction D2 of the side rails 21 as described above, the dimension of the battery pack 4 in the vehicle width direction D2 is reserved to be larger than the distance between the web portions of the side rails 21. Thus, the capacity of the battery pack 4 is increased. Also, the battery pack 4 is preferably arranged over a wide area of the wheelbase (the distance between a front axle and a rear axle) in order to ensure the cruising range of the electric truck 3.

In a relatively small electric truck 3 (having a relatively short wheelbase), one battery pack 4 may be disposed over the almost entire wheelbase. In this case, front wheels are disposed close to the front of the battery pack 4, and rear wheels are disposed close to the rear of the battery pack 4.

The size of the electric truck 3 and the number of battery packs 4 are not limited to those exemplified in the first embodiment. In a relatively large electric truck 3 (having a relatively long wheelbase), multiple battery packs 4 may be arranged side by side in the vehicle length direction D1. Also in this case, by arranging the multiple battery packs 4 over a wide area of the wheelbase, the multiple battery packs 4 as a whole can reserve a larger capacity and thereby ensure the cruising range.

The support device 1 couples the battery pack 4 to the side rails 21 and supports the battery pack 4. In other words, the battery pack 4 is supported by the side rails 21 via the support device 1. The first embodiment illustrates the support device 1 formed to be symmetric (plane-symmetric) about a symmetry plane which is a vertical plane passing through the center of the vehicle width direction D2 and extending in the vehicle length direction D1.

The support device 1 includes a battery-side bracket 5 that receives the battery pack 4 and frame-side brackets 6 that each couple the battery-side bracket 5 to one of the side rails 21. The battery-side bracket 5 is an outer wall disposed on the outer circumference of the battery pack 4 and has a function of protecting the battery pack 4 from impact loads. On the other hand, the frame-side brackets 6 each extend outward in the vehicle width direction D2 and downward from one of the side rails 21, and have a function of suspending the battery pack 4 received in the battery-side bracket 5 from the side rails 21.

The battery-side bracket 5 of the first embodiment includes: a pair of end cross members 7 disposed on the outsides in the vehicle width direction D2 (left and right) of the battery pack 4; and a pair of main brackets 8 disposed on the outsides in the vehicle length direction D1 (front and rear) of the battery pack 4. The battery-side bracket 5 is arranged, with these end cross members 7 and the main brackets 8, so as to surround the four sides of the battery pack 4.

Figure 2:
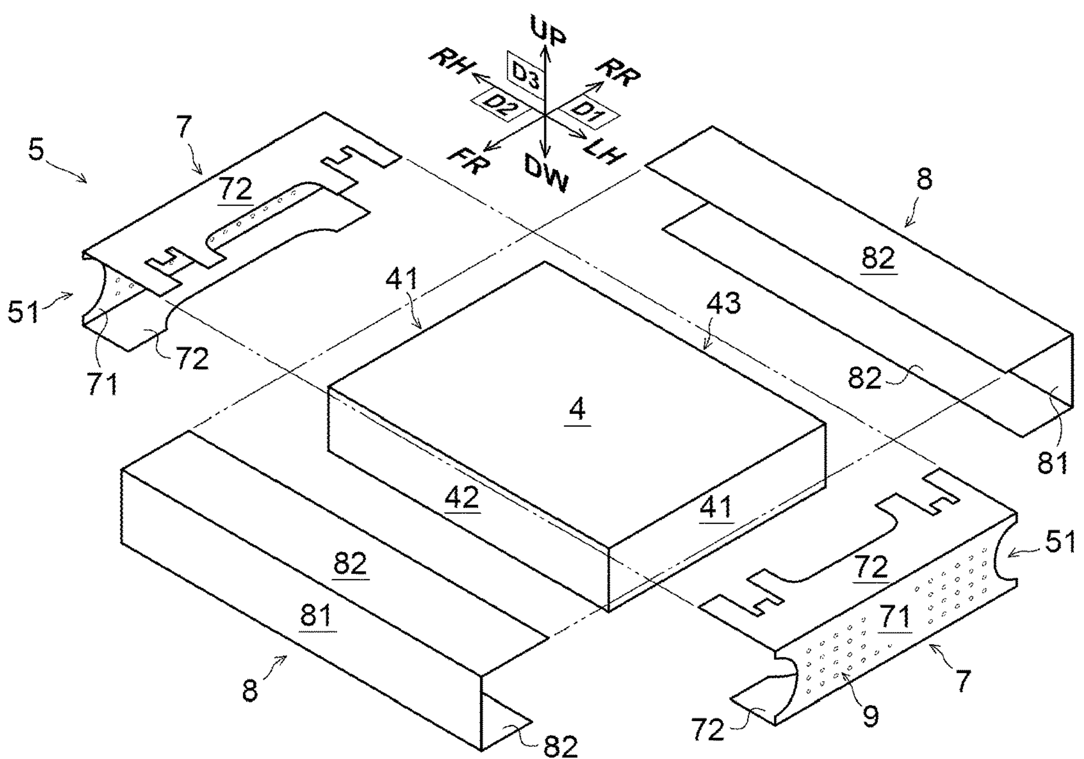
FIG. 2 is an exploded perspective view for explaining a structure of the support device of FIG. 1.

The pair of end cross members 7 are formed to be symmetric with respect to each other about a symmetry plane which is a vertical plane passing through the center of the vehicle width direction D2 and extending in the vehicle length direction D1. The pair of main brackets 8 are also formed to be symmetric with respect to each other about a symmetry plane which is a vertical plane passing through the center of the vehicle length direction D1 and extending in the vehicle width direction D2. As shown in FIG. 2, both the end cross members 7 and the main brackets 8 of the first embodiment are formed of steel plates and are formed into channel shapes.

Each end cross member 7 has a web portion 71 arranged along the battery side-face 41 and a pair of flange portions 72 respectively protruding from the upper and lower edges of the web portion 71 toward the battery pack 4 (inward in the vehicle width direction D2). By arranging the web portion 71 spaced from the corresponding battery side-face 41 (with a gap), each end cross member 7 of the first embodiment can reserve a deformation allowance (absorbing allowance of the impact load) in the event of a possible collision.

The battery-side bracket 5 has opposing plates 51 each facing one of the battery side-faces 41. In the battery-side bracket 5, the web portion 71 of each end cross member 7 serves as the opposing plate 51 facing the battery side-face 41. In the first embodiment, since the web portion 71 of each end cross member 7 is spaced apart from the battery side-face 41 as described above, the opposing plate 51 is not in contact with the battery side-face 41. Alternatively, the opposing plate 51 (i.e., the web portion 71 of the end cross member 7) may be arranged in contact with the battery side-face 41.

Each main bracket 8 has a web portion 81 arranged along a front face 42 or a rear face 43 of the battery pack 4 and a pair of flange portions 82 protruding from the upper and lower edges of the web portion 81 toward the battery pack 4 (inward in the vehicle length direction D1). The flange portions 82 of each main bracket 8 are laid closer to the battery pack 4 (inside in the vehicle height direction D3) than the flange portions 72 of the end cross members 7, and are coupled to the flange portions 72 of the end cross members 7 by non-illustrated fastening devices or any coupling means (welding, bonding).

As shown in FIG. 1, the frame-side brackets 6 are fixed to portions where the upper flange portions 72 and 82 of the end cross members 7 and the main brackets 8 overlap. The frame-side brackets 6 are also fixed to the web portions of the side rails 21. Here, an example is illustrated in which the two frame-side brackets 6 are provided to each of the left and the right sides (i.e., the outside in the vehicle width direction D2 of each side rail 21) of the electric truck 3 (four frame-side brackets 6 in total).

[1-2. Main Part Configuration]

Each of the opposing plates 51 (web portions 71) of the battery-side bracket 5 is provided with a patterned opening unit 9. The patterned opening unit 9 is a portion where multiple holes 95 arranged in a predetermined pattern are formed, and where on-board devices 10 are to be attached. The term "predetermined pattern" used herein means a pattern including "an arrangement shape of the holes 95, formed by tightly placing planar shapes each having at least one or more holes 95." "A predetermined pattern" includes not only a pattern including a periodic arrangement shape, but also a pattern including an aperiodic arrangement shape.

In any case, various on-board devices 10 can be mounted on the battery-side bracket 5 via the multiple holes 95 provided in the patterned opening unit 9. The shape of each hole 95 can be arbitrarily set, and may be, for example, circular or rectangular. Further, the front and rear edges of each opposing plate 51 of the first embodiment may each be formed in a shape that is cut out in a semilunar shape in a side view in order to, for example, reduce the weight of the battery-side bracket 5. In this case, the patterned opening unit 9 is disposed in a range sandwiched between these notches at the front and rear ends.

Examples of the layout of the holes 95 provided in the patterned opening unit 9 are illustrated in FIGS. 3(A)-3(C) and 4. Each of the axes C1 shown in these drawings extends in the vehicle height direction D3 and serves as a center line of the opposing plate 51 (web portion 71) in a side view of the battery-side bracket 5 (end cross member 7), and each of the axes C2 extends in the vehicle length direction D1 and serves as a center line of the opposing plate 51 (web portion 71).

Figure 3A:
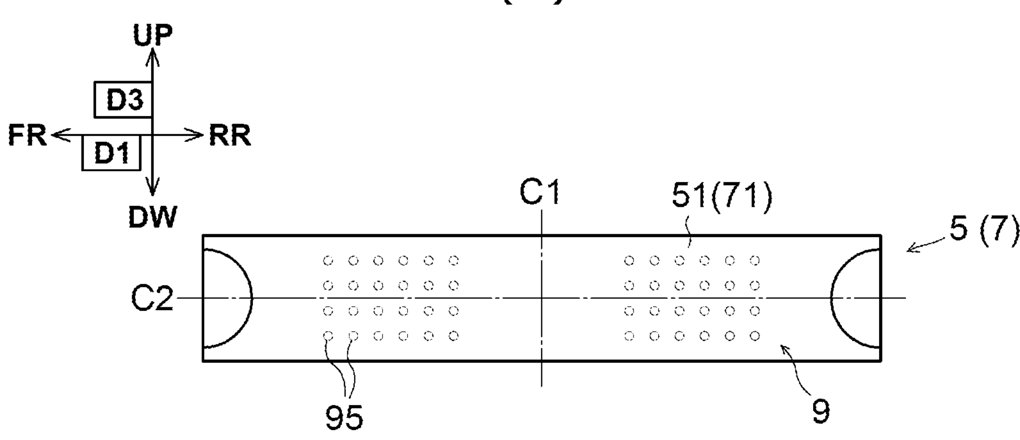
FIGS. 3(A)-3(C) are side views each illustrating a pattern of holes formed in a patterned opening unit of an end cross member in the support device of FIG. 1.
Figure 3B:
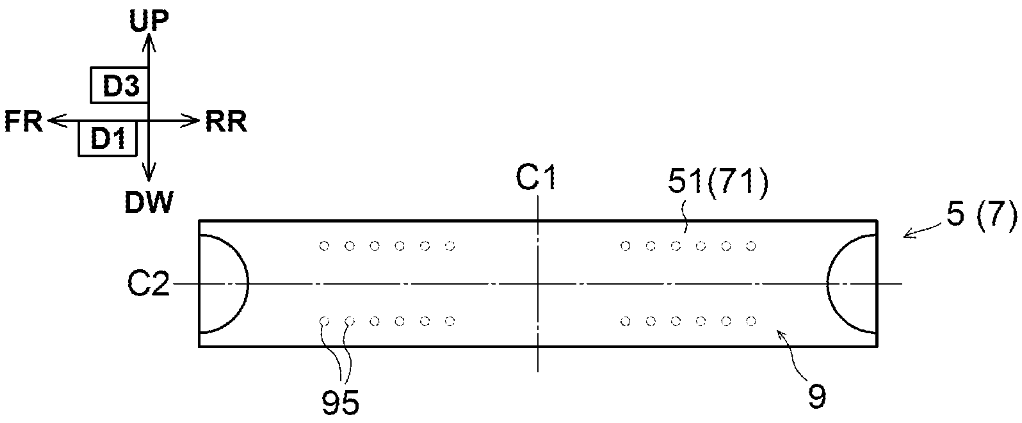

FIGS. 3(A) and 3(B) are each a side view of the battery-side bracket 5 (end cross member 7) on which the multiple holes 95 arranged in a planar grid pattern (e.g., square grid pattern, rectangular grid pattern, diagonal grid pattern) are provided so as to have a vertical line of symmetry and a horizontal line of symmetry. The longitudinal pitch of the holes 95 is set to, for example, the same as or an integral multiple of the lateral pitch thereof. In FIG. 3(A), patterns of the square grid pattern (or rectangular grid pattern) each having four rows in the longitudinal direction and six columns in the lateral direction are arranged at a predetermined interval in the vehicle length direction D1 (e.g., at the same lateral pitch or at a dimension of an integral multiple). FIG. 3(B) illustrates a pattern in which the intermediate rows (the second and third rows from the top) have been removed from the pattern of the holes 95 of FIG. 3(A). These layouts each have both a vertical line of symmetry about the axis C1 and a horizontal line of symmetry about the axis C2.

Figure 3C:
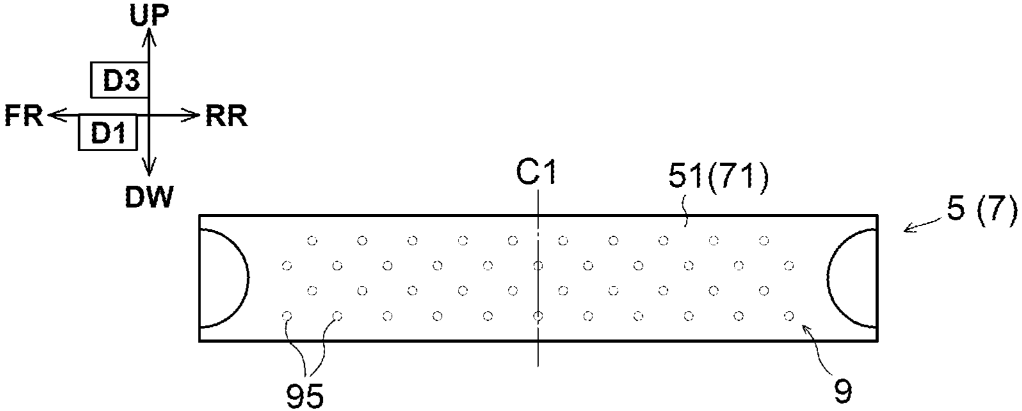

FIG. 3(C) shows a pattern in which the multiple holes 95 arranged into a diagonal grid pattern are provided so as to have a vertical line of symmetry about the axis C1 in a side view of the battery-side bracket 5 (end cross member 7). In this drawing, four rows each including the holes 95 arranged at predetermined intervals in the lateral direction are arranged in the longitudinal direction. The lateral positions of the holes 95 are set so as not to coincide with the lateral positions of the holes 95 included in the neighboring upper and lower rows, and for example, the arrangement pattern of the holes 95 is in a staggered pattern. Further, the longitudinal pitch of the holes 95 is set to be, for example, the same as the lateral pitch thereof, and the diagonal pitch is set to a constant value.

Figure 4:
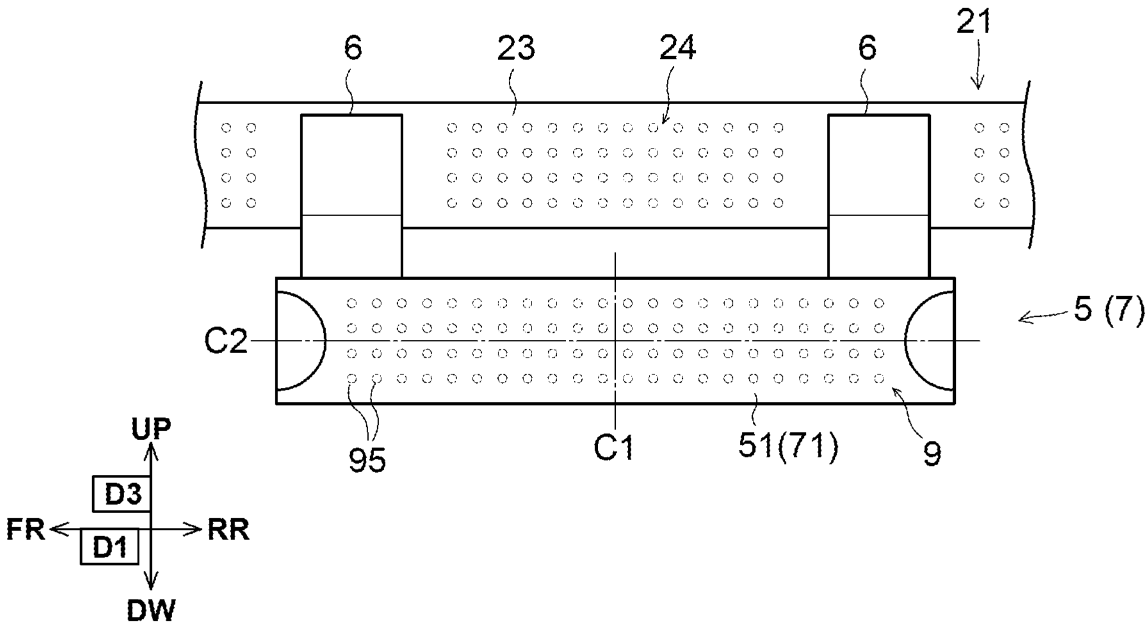
FIG. 4 is a left side view illustrating a side rail and an end cross member of the support device of FIG. 1.

FIG. 4 shows a configuration in which an arrangement of the holes 95 provided in the patterned opening unit 9 corresponds to a hole pattern 24 of the side rail 21. On a web face 23 of the side rail 21, a predetermined hole pattern 24 (e.g., a hole pattern 24 of a planar grid pattern) is formed. The arrangement pitch (longitudinal and lateral pitches) of the holes 95 is set to be the same as or an integral multiple of the arrangement pitch in the hole pattern 24. The layout of the holes 95 in the patterned opening unit 9 may completely match or partially match the hole pattern 24 of the side rail 21. Further, the multiple holes 95 may be arranged so as to correspond to the hole pattern 24 formed at a portion located vertically above the battery pack 4 in the web face 23 of the side rail 21. For example, the multiple holes 95 may be formed in the patterned opening unit 9 so as to have a layout in which the hole pattern 24 of the side rail 21 is moved directly and vertically down in a side view of the electric truck 3. The specific positions and number of the holes 95 are not limited to the above examples.

Figure 5:
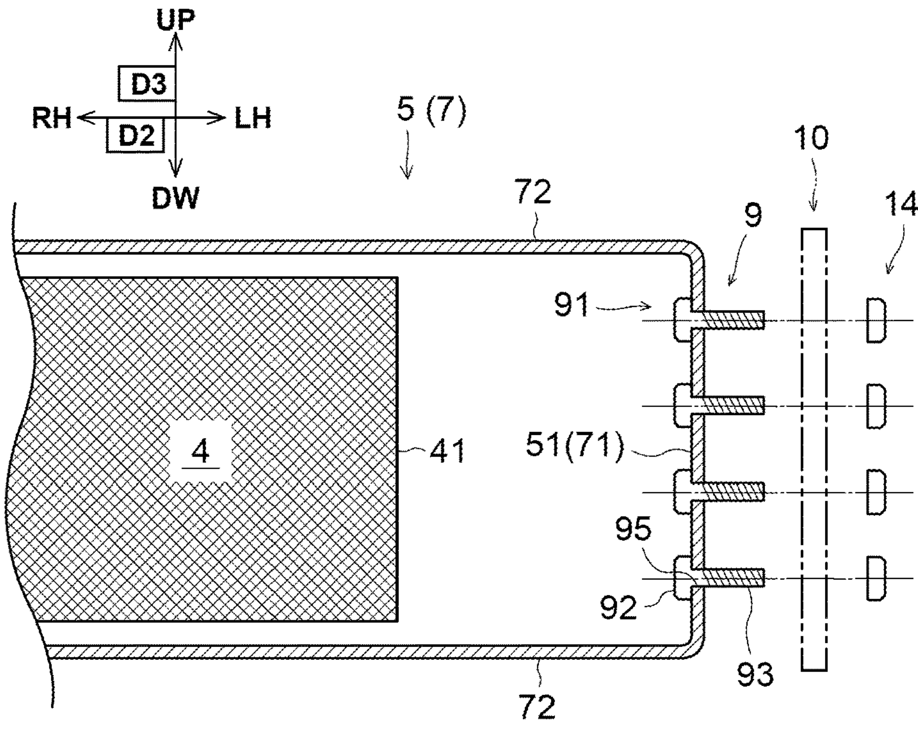
FIG. 5 is a sectional diagram illustrating a manner of attaching an on-board device to the support device of FIG. 1.
Figure 6:
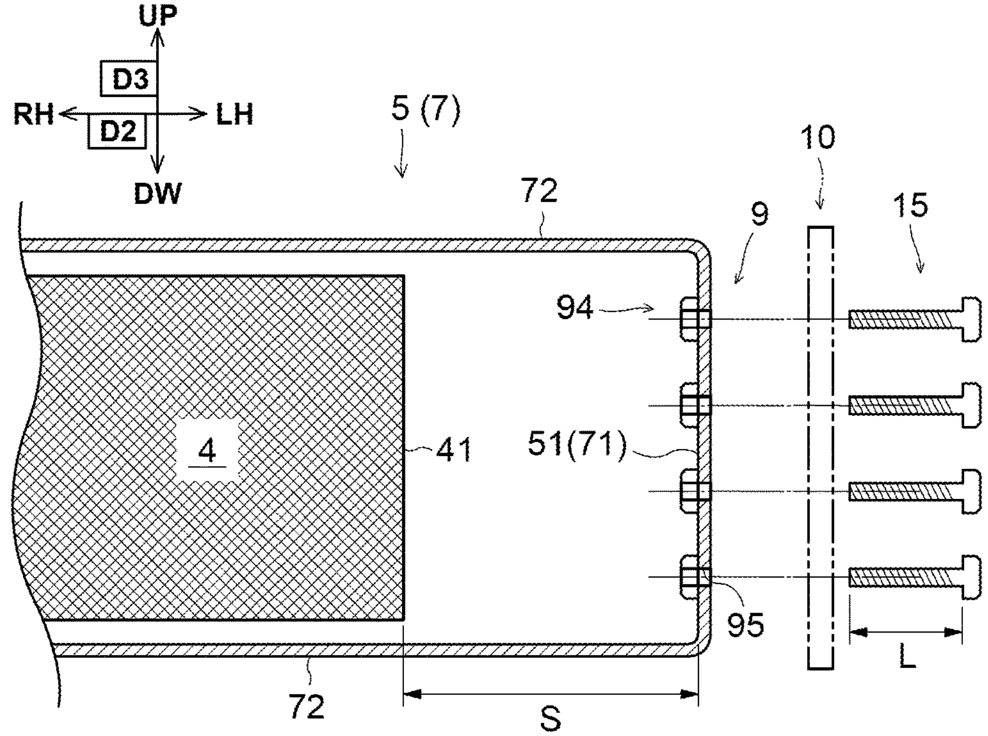
FIG. 6 is a sectional diagram illustrating a manner of attaching an on-board device to the support device of FIG. 1.

As shown in FIGS. 5 and 6, each patterned opening unit 9 may include weld bolts 91 and/or weld nuts 94 for installing the on-board device(s) 10 to the battery-side bracket 5 (end cross member 7).

As shown in FIG. 5, each of the weld bolts 91 has a head portion 92 welded to the opposing plate 51 and a screw portion 93 protruding outward from the head portion 92. In detail, each of the weld bolts 91 is fixed to the opposing plate 51 in a state where the screw portion 93 thereof is inserted from inside in the vehicle width direction D2 through the hole 95 which penetrates the opposing plate 51 (web portion 71) of the battery-side bracket 5.

The screw portion 93 of the weld bolt 91 is fastened to a nut 14 after being inserted into a through-hole (not shown) formed on the on-board device 10 (or its bracket, for example). Accordingly, the on-board device 10 is installed to the patterned opening unit 9 including the weld bolts 91.

As shown in FIG. 6, each of the weld nuts 94 is welded to the opposing plate 51. More specifically, each of the weld nuts 94 is fixed to the opposing plate 51 while being positioned coaxially with the hole 95.

The weld nut 94 is fastened to a bolt 15 inserted from the outside in the vehicle width direction D2 into a through-hole (not shown) formed on the on-board device 10 (or its bracket, for example). Accordingly, the on-board device 10 is installed to the patterned opening unit 9 including the weld nuts 94. Incidentally, the bolt 15 fastened to the weld nut 94 has a length size L of the screw portion set to be sufficiently shorter than a distance (gap) S between the battery side-face 41 and the opposing plate 51 ($L<S$) in order to avoid interference with the battery pack 4.

The method for mounting the on-board device 10 on the patterned opening unit 9 is not limited to the above methods using the weld bolts 91 and/or the weld nuts 94, and various known methods can be applied. Alternatively, the on-board device 10 may be mounted on the patterned opening unit 9 by a conventional bolt or nut (not shown) that is not welded to the opposing plate 51. Further alternatively, the on-board device 10 may be welded directly to the patterned opening unit 9.

As shown in FIG. 1, the on-board device 10 of the first embodiment includes: a casing 12 provided with a charging opening 11 through which the battery pack 4 is charged from outside; and a sensor 13 that detects an object located outside in the vehicle width direction D2. Here, the example is assumed that the casing 12 is mounted on the left patterned opening unit 9 and the sensor 13 is mounted on the right patterned opening unit 9. Both the casing 12 and the sensor 13 are provided so as to protrude outward in the vehicle width direction D2 further than the battery-side bracket 5.

The casing 12, which is also referred to as a Charge Inlet Box (CIB), is provided at a predetermined position where the charging opening 11 can be accessed from the outside of the electric truck 3. In the casing 12, the charging opening 11 is disposed outward in the vehicle width direction D2.

An example of the sensor 13 is a radar or camera applied to a technique (so-called a vehicle side object sensing sensor) of detecting an object existing in a blind spot of the electric truck 3 and informing the driver of the detected object. The sensor 13 is disposed at a predetermined position where the blind spot falls within a detection range.

2. Actions and Effects (1) According to the support device 1 of the first embodiment, since the patterned opening unit 9 that mounts the on-board device 10 on the battery-side bracket 5 is provided, the impact load applied from the outside in the vehicle width direction D2 in the event of a side collision is input into the on-board device 10 before being input into the battery-side bracket 5. This allows the initial input of the impact load to be absorbed by the on-board device 10 before being absorbed by the battery-side bracket 5.

Consequently, the impact load to be transmitted to the battery-side bracket 5 can be reduced, so that the impact load to be transmitted to the battery pack 4 through the battery-side bracket 5 can also be reduced. Therefore, the protectability of the battery pack 4 in a side collision can be enhanced.

Further, in the electric truck 3, since the battery pack 4 is mounted under the side rails 21 and the battery side-faces 41 are located outside in the vehicle width direction D2 further than the side rails 21, the capacity of the battery pack 4 can be increased. On the other hand, since the battery pack 4 protrudes outward in the vehicle width direction D2 further than the side rails 21, the mountability of the on-board device 10 onto the side rails 21 may be lowered. Regarding this, each of the opposing plates 51 of the above battery-side bracket 5 is provided with the patterned opening unit 9 in which the multiple holes 95 are formed. This structure reserves a mounting space for the on-board device 10 on the outside of the battery-side bracket 5, and thus, improves the mountability of the on-board device. Further, since the weight of the battery-side bracket 5 can be reduced by the amount of the multiple holes 95, it is possible to suppress the weight increase of the support device 1.

Further, the gap having the distance S is ensured between the opposing plate 51 of the battery-side bracket 5 (web portion 71 of the end cross member 7) and the battery side-face 41. By providing such a gap, while avoiding the interference between, for example, a fastening device (such as the weld bolts 91 and the weld nuts 94) of the on-board device 10 and the battery pack 4, it is possible to ensure a deformation allowance of the battery-side bracket 5 against an impact in a side collision, and to further improve shock absorbability and the protectability of the battery pack 4.

Incidentally, if considering only the mountability of the on-board device 10 onto the electric truck 3, a conceivable structure may include multiple holes formed on the front face side and/or the rear face side of the battery pack 4 (web portions 81 of the main brackets 8) to mount the on-board device 10. However, in this case, the sides of the battery pack 4 are not covered with the on-board devices 10, and thus, the protectability of the battery pack 4 in the event of a side collision lowers. In particular, since the battery side-faces 41 are positioned to protrude outward in the vehicle width direction D2 further than the side rails 21, it is desirable to take some protection against a side collision. As a solution to such problems, the first embodiment can easily improve the protectability of the battery pack 4 in the event of a side collision by attaching the on-board devices 10 to the patterned opening units 9 and consequently covering the sides of the battery pack 4.

Further, if the type of the on-board device 10 to be mounted on the electric truck 3 is predetermined, it is also conceivable to provide only one or more holes 95 conforming to the on-board device 10 in the patterned opening unit 9. However, in this case, it is difficult to deal with a possible change in the type or the specification of the on-board device 10. Further in this case, the arrangement of the multiple holes 95 on the plate surface of the opposing plate 51 is likely to be uneven, which has a risk of causing local deformation or stress concentration. With the foregoing problems in view, since the patterned opening unit 9 of the first embodiment is provided with the multiple holes 95 arranged in a predetermined pattern, it is possible to make the stiffness distribution substantially uniform over the opposing plate 51, so that the occurrence of local deformation or stress concentration can be prevented.

In addition, if considering only the protectability of the battery pack 4 against a side collision, it is desirable to increase the strength and stiffness of the opposing plates 51 of the battery-side bracket 5, which are respectively located on the sides of the battery pack 4. Therefore, in an existent and conventional support device 1 of a battery pack 4, it may not be recommended to form the multiple holes 95 on the opposing plates 51 of the battery-side bracket 5. In contrast, the inventor of the present invention has found that the main physical load in the event of a side collision is absorbed not by the opposing plate 51 but is transmitted from the flange portion 72 of the end cross member 7 to the frame-side brackets 6 and consequently is absorbed by the side rail 21. In addition, the inventor has also found that intentionally forming the multiple holes 95 on the opposing plate 51 of the battery-side bracket 5 and mounting the on-board device 10 on the opposing plate 51 causes the physical load in the event of a side collision to be absorbed by the on-board device 10, and consequently reduces the load to be input. Based on these novel findings, the first embodiment improves the mountability of the on-board device 10 by intentionally forming the multiple holes 95 on the opposing plate 51 of the battery-side bracket 5, and easily obtains the protection effect of the battery pack 4 by the on-board device 10. In this regard, the support device 1 of the battery pack 4 according to the first embodiment has been invented based on an ingenious idea not found in the prior art, and can be said to have unique properties far from the prior art.

(2) The multiple holes 95 may be arranged to have a vertical line of symmetry in a side view of the battery-side bracket 5. In each of the examples shown in FIGS. 3(A)-3(C) and 4, the multiple holes 95 are arranged to have a vertical line of symmetry with respect to the axis C1. Such an arrangement of the holes 95 can smooth out the stiffness distribution in the left-right direction (the vehicle front-rear direction) in the side view of the battery-side bracket 5, and can make the stiffness distribution substantially uniform, for example. Therefore, the protectability of the battery pack 4 can be further enhanced.

(3) The multiple holes 95 may be arranged to have a horizontal line of symmetry in a side view of the battery-side bracket 5. In each of the examples shown in FIGS. 3(A)-3(B) and 4, the multiple holes 95 are arranged to have a horizontal line of symmetry with respect to the axis C2. Such an arrangement of the holes 95 can smooth out the stiffness distribution in the vertical direction in the side view of the battery-side bracket 5, and can make the stiffness distribution substantially uniform, for example. Therefore, the protectability of the battery pack 4 can be further enhanced.

(4) The multiple holes 95 may be arranged in a planar grid pattern. Examples of the planar grid pattern here include a square grid pattern, a rectangular grid pattern, or a diagonal grid pattern. For example, FIG. 3(A) is an example of a square grid pattern, and FIG. 3(C) is an example of a diagonal grid pattern. Thus, by placing the multiple holes 95 in a planar grid pattern, the mounting position of the on-board device 10 can be easily changed (translated), which can enhance the versatility. Further, this configuration allows multiple on-board devices 10 to be easily mounted, so that the mountability of the on-board devices 10 can be further improved.

(5) The multiple holes 95 may be arranged to correspond to the hole pattern 24 of side rail 21. For example, as shown in FIG. 4, the multiple holes 95 are arranged so as to coincide with part of the hole pattern 24. As such, matching the arrangement of the multiple holes 95 with the hole pattern 24 makes it possible to easily move the on-board device 10 conforming to the hole pattern 24 of the side rail 21 to the battery-side bracket 5. Thus, the mounting compatibility of the on-board device 10 can be maintained and the usability (convenience for vehicle users) can be enhanced.

(6) The multiple holes 95 may be arranged so as to correspond to the hole pattern 24 formed on a portion located vertically above the vehicular battery pack in the web face 23 of the side rail 21. For example, as shown in FIG. 4, the multiple holes 95 are arranged so as to have a layout in which the hole pattern 24 of the side rail 21 is moved directly and vertically down in a side view of the electric truck 3. Such an arrangement of the holes 95 allows the mounting position of the on-board device 10 in the vehicle length direction to be substantially identical in the electric truck 3 equipped with the battery pack 4 and in an electric truck 3 not equipped with a battery pack 4.

(7) The arrangement pitch of the multiple holes 95 may be set to an integral multiple of that of the hole pattern 24. For example, assuming that the longitudinal pitch and the lateral pitch of the hole pattern 24 are both 50 [mm], the longitudinal pitch and the lateral pitch of the multiple holes 95 are set to 50 [mm] or 100 [mm]. With such setting of the arrangement pitch, the mounting compatibility of the on-board device 10 can be maintained to some degree, and the usability can be enhanced. Incidentally, to enhance the mounting compatibility of the on-board device 10, the arrangement pitch of the multiple holes 95 may be set identical to the arrangement pitch of the hole pattern 24.

(8) According to the electric truck 3 including the support device 1, it is possible to ensure the mountability of the on-board device 10 while enhancing the protectability of the battery pack 4 in the event of a side collision, as described above.

(9) As shown in FIG. 1, according to the electric truck 3 in which the casing 12 provided with the charging opening 11 is mounted on the patterned opening unit 9, the charging opening 11 can be easily disposed on the outside in the vehicle width direction D2 as compared with a structure that mounts the casing 12 on the side rail 21. This makes it possible to arrange the casing 12 at a predetermined position without extending a dedicated bracket for arranging the casing 12 at the predetermined position from side rail 21. Accordingly, the workability of supplying electricity to the charging opening 11 can be ensured while reducing the number of components and simplifying the structure.

(10) According to the electric truck 3 in which the sensor 13 that detects an object located outside in the vehicle width direction D2 is mounted on the patterned opening unit 9, the sensor 13 can be easily disposed on the outside in the vehicle width direction D2 as compared with a structure that mounts the sensor 13 on the side rail 21. This makes it possible to arrange the sensor 13 at a predetermined position without extending a dedicated bracket for arranging the sensor 13 at the predetermined position from the side rail 21. Accordingly, the detection area of the sensor 13 can be appropriately set while reducing the number of components and simplifying the structure.

3. Second Embodiment

A support device 1 of a vehicular battery pack according to a second embodiment is different from the first embodiment in the configuration of the opposing plate 51 (web portion 71) of the battery-side bracket 5.

Figure 7:
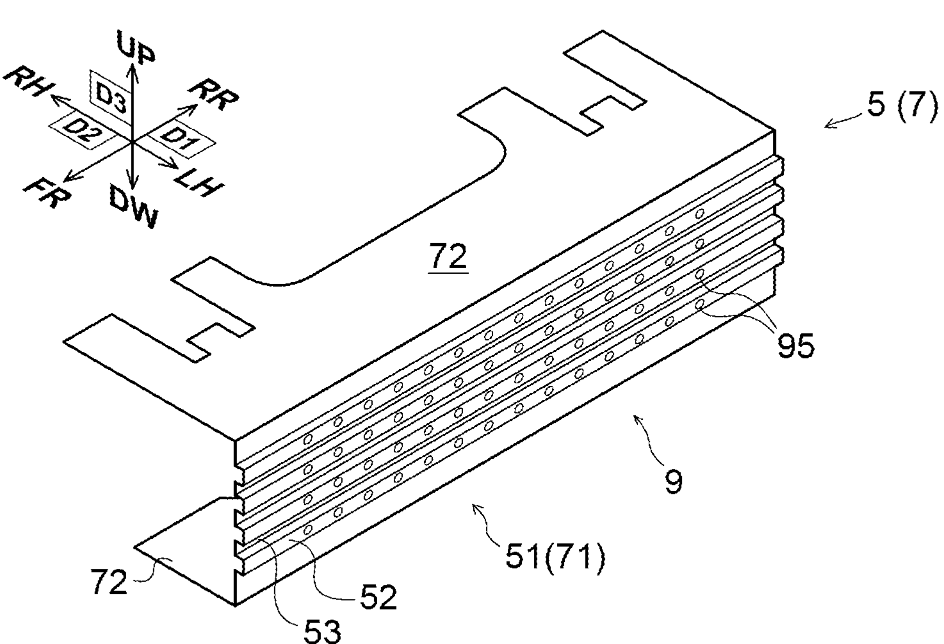
FIG. 7 is a perspective view of an end cross member included in a support device for a vehicular battery pack according to a second embodiment.

As shown in FIG. 7, the opposing plate 51 (web portion 71) is provided with convex parts 52 each formed in a shape protruding outward in the vehicle width direction D2 and recess parts 53 each located inside in the vehicle width direction D2 from the convex parts 52. The multiple holes 95 described above are formed through the convex parts 52. The protruding shape of each convex part 52 may have a folded-line cross-sectional shape or may have a curved cross-sectional shape. The protruding shape of each convex part 52 shown in FIG. 7 has a cross section in the form of a trapezoid (or rectangle) protruding outward in the vehicle width direction D2 on the basis of a face connected to the flange portions 72 in the opposing plate 51 (web portion 71).

Further, on the basis of the portion where the holes 95 are formed in the convex parts 52, the recess parts 53 are each formed in a shape recessed inward in the vehicle width direction D2. The above convex parts 52 and recess parts 53 are alternately arranged. Therefore, the overall shape of the opposing plate 51 (web portion 71) is wavy. In other words, if the opposing plate 51 (web portion 71) is imaginarily cut in the direction along which the convex parts 52 and the recess parts 53 are alternately arranged, the cut section has a wavy shape that oscillates in the vehicle width direction D2.

The entire shape of each convex part 52 shown in FIG. 7 can be regarded as a protrusion which has a protruding portion linearly extending along the vehicle length direction D1. Similarly, the entire shape of each recess part 53 shown in FIG. 7 can be regarded as a groove which has a recessed portion linearly extending along the vehicle length direction D1. The extending directions of these convex parts 52 and recess parts 53 are parallel. Incidentally, the holes 95 may be disposed at any positions on the surface of the convex parts 52. In the example shown in FIG. 7, of the convex parts 52, the holes 95 are disposed in an outermost planar portion in the vehicle width direction D2. Thus, the entire planar portion through which the holes 95 are formed constitutes the patterned opening unit 9.

Figure 8A:
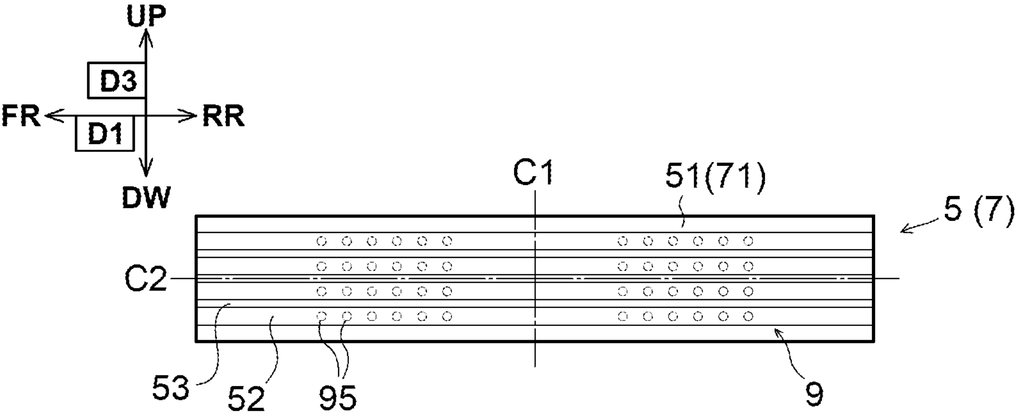
FIGS. 8(A)-8(C) are side views each illustrating a pattern of holes formed in a patterned opening unit of the end cross member in the support device of FIG. 7.
Figure 8B:
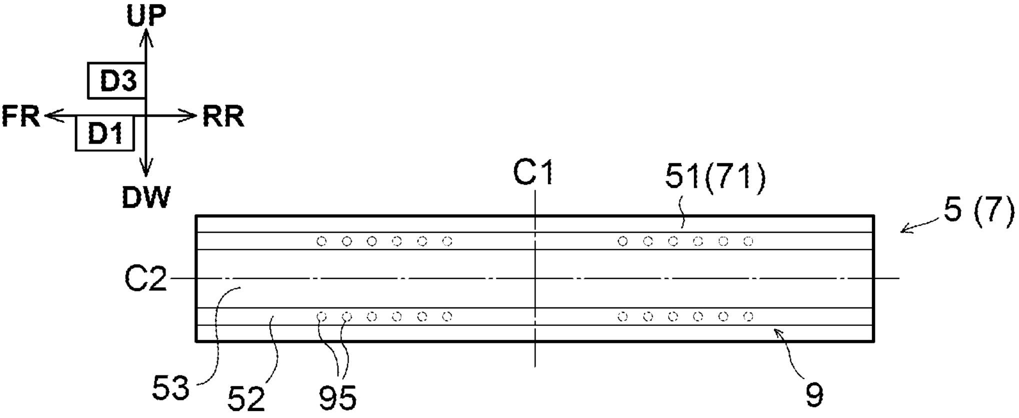

Examples of the layout of the holes 95 provided in the patterned opening unit 9 are illustrated in FIGS. 8(A)-8(C) and 9. FIGS. 8(A) and 8(B) each illustrate a layout in which the multiple holes 95 arranged in a planar grid pattern (e.g., square grid pattern, rectangular grid pattern, diagonal grid pattern) are provided so as to have vertical and horizontal lines of symmetry in a side view of the battery-side bracket 5 (end cross member 7). The longitudinal pitch of the holes 95 is set to, for example, the same as or an integral multiple of the lateral pitch thereof. Likewise, the longitudinal pitch of the convex parts 52 (the dimension corresponding to the period of the convex and recess parts) is also set to be the same as or an integral multiple of the longitudinal pitch of the holes 95. In FIG. 8(A), patterns of a square grid pattern (or rectangular grid pattern) each having four rows in the longitudinal direction and six columns in the lateral direction are arranged at a predetermined interval in the vehicle length direction D1 (e.g., at the same lateral pitch or at a dimension of an integral multiple). FIG. 8(B) illustrates a pattern in which the intermediate rows (the second and third rows from the top) have been removed from the pattern of the holes 95 of FIG. 8(A). These layouts each have both a vertical line of symmetry about the axis C1 and a horizontal line of symmetry about the axis C2. Alternatively, only the holes 95 formed on the intermediate rows may be omitted from the pattern of the holes 95 of FIG. 8(A), maintaining the convex parts 52 on which the intermediate rows were arranged.

Figure 8C:
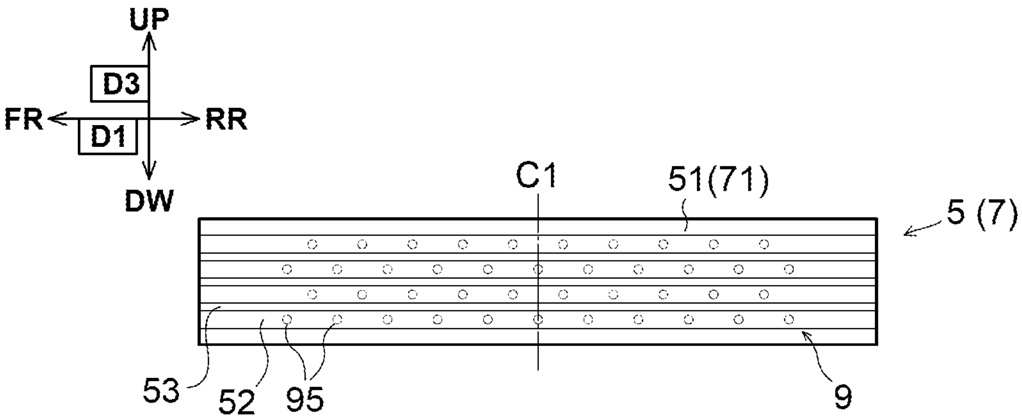

FIG. 8(C) shows a pattern in which the multiple holes 95 arranged into a diagonal grid pattern are provided so as to have a vertical line of symmetry about the axis C1 in a side view of the battery-side bracket 5 (end cross member 7). In this drawing, four rows each including the holes 95 arranged at predetermined intervals in the lateral direction are arranged in the longitudinal direction. The lateral positions of the holes 95 are set so as not to coincide with the lateral positions of the holes 95 included in the neighboring upper and lower rows, and for example, the arrangement pattern of the holes 95 is in a staggered pattern. Further, the longitudinal pitch of the holes 95 is set to be, for example, the same as the lateral pitch thereof, and the diagonal pitch is set to a constant value.

Figure 9:
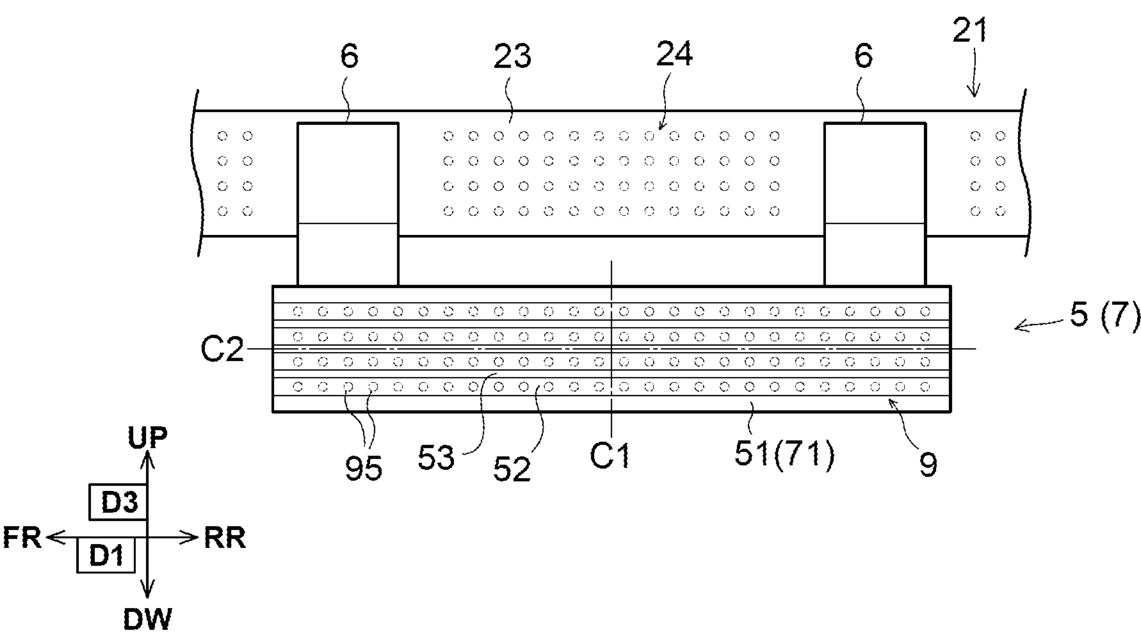
FIG. 9 is a left side view illustrating a side rail and the end cross member of the support device of FIG. 7.

FIG. 9 shows a configuration in which an arrangement of the holes 95 provided in the patterned opening unit 9 corresponds to the hole pattern 24 of the side rail 21. On the web face 23 of the side rail 21, the predetermined hole pattern 24 (e.g., the hole pattern 24 of a planar grid pattern) is formed. The arrangement pitch (longitudinal and lateral pitches) of the holes 95 is set to be the same as or an integral multiple of the arrangement pitch in the hole pattern 24. The layout of the holes 95 in the patterned opening unit 9 may completely match or partially match the hole pattern 24 of the side rail 21. Further, the multiple holes 95 may be arranged so as to correspond to the hole pattern 24 formed at a portion located vertically above the battery pack 4 in the web face 23 of the side rail 21. For example, the multiple holes 95 may be formed in the patterned opening unit 9 so as to have a layout in which the hole pattern 24 of the side rail 21 is moved directly and vertically down in a side view of the electric truck 3. The specific positions and number of the holes 95 are not limited to the above examples.

Figure 10:
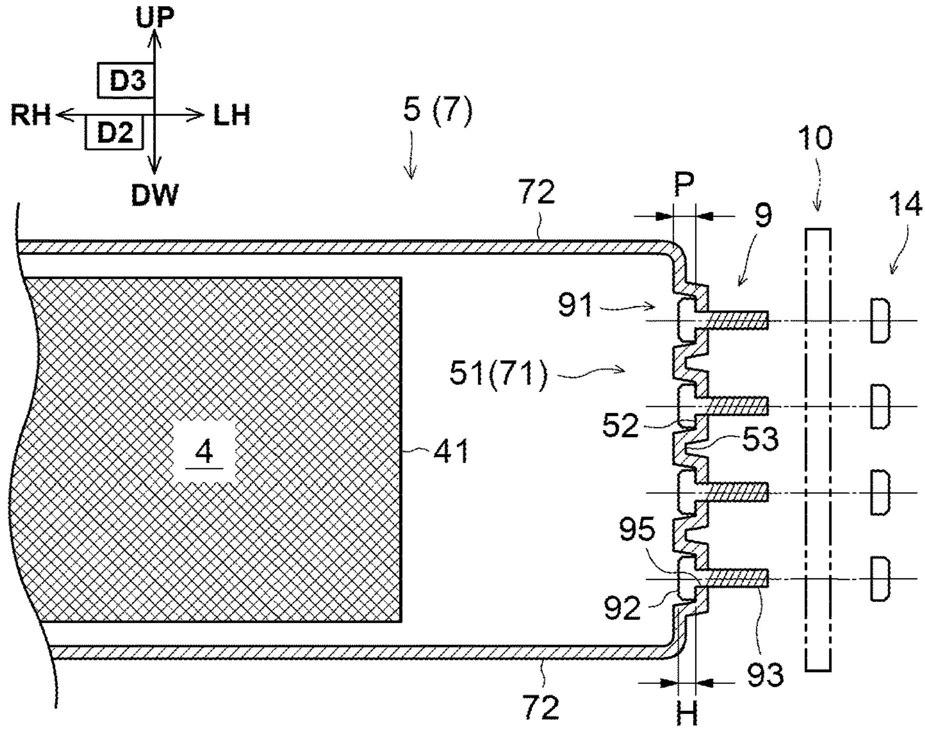
FIG. 10 is a sectional diagram illustrating a manner of attaching an on-board device to the support device of FIG. 7.
Figure 11:
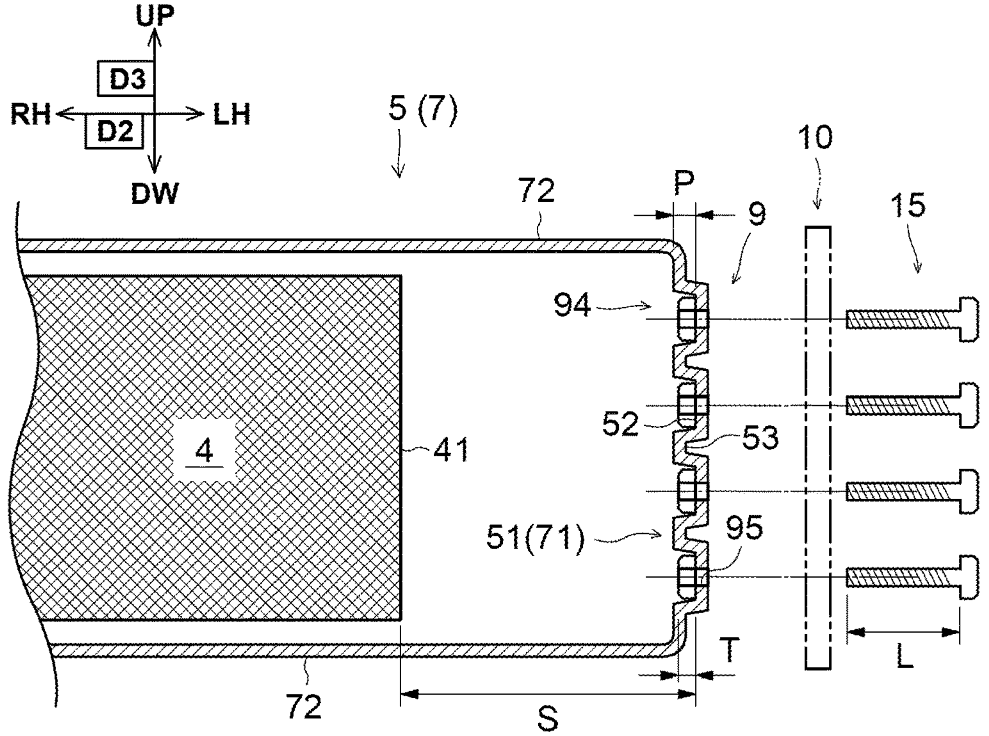
FIG. 11 is a sectional diagram illustrating a manner of attaching an on-board device to the support device of FIG. 7.

As shown in FIGS. 10 and 11, the patterned opening unit 9 may include the weld bolts 91 or the weld nuts 94 for attaching the on-board device 10 to the battery-side bracket 5 (end cross member 7).

As shown in FIG. 10, each weld bolt 91 has the head portion 92 welded to the opposing plate 51 and the screw portion 93 protruding outward from the head portion 92. Specifically, each of the weld bolts 91 is fixed to the opposing plate 51 in a state where the screw portion 93 thereof is inserted from inside in the vehicle width direction D2 through the hole 95 penetrating the opposing plate 51 (web portion 71) of the battery-side bracket 5. Preferably, the height H of the head portion 92 of each weld bolt 91 is set to a dimension smaller than the protruding dimension P of the convex part 52 shown in FIG. 6 (H<P). This structure inhibits the head portion 92 of each weld bolt 91 from interfering with the battery pack 4 in the event of a side collision of the vehicle.

The screw portion 93 of each weld bolt 91 is fastened to the nut 14 after being inserted into a through-hole (not shown) formed on the on-board device 10 (or its bracket or the like). Thereby the on-board device 10 is attached to the patterned opening unit 9 including the weld bolts 91.

As shown in FIG. 11, each the weld nuts 94 is welded to the opposing plate 51. Specifically, each of the weld nuts 94 is fixed to the opposing plate 51 while being positioned coaxially with the hole 95.

The weld nut 94 is fastened to the bolt 15 inserted from the outside in the vehicle width direction D2 into a through-hole (not shown) formed on the on-board device 10 (or its bracket, for example). Thereby, the on-board device 10 is attached to the patterned opening unit 9 including the weld nuts 94. Incidentally, the bolt 15 fastened to the weld nut 94 has the length size L of the screw portion set sufficiently shorter than the distance (gap) S between the battery side-face 41 and the opposing plate 51 (L<S) in order to prevent interference with the battery pack 4. Preferably, the thickness T of each weld nut 94 is set to a dimension smaller than the protruding dimension P of each convex part 52 shown in FIG. 7 (T<P). This structure hinders the weld nuts 94 from interfering with the battery pack 4 in the event of a side collision of the vehicle. Incidentally, the length size L of the screw portion of each bolt 15 is preferably set to the shortest possible dimension as far as the crew portion can be screwed with the weld nut 94.

Since the support device 1 of the second embodiment alternately arranges the convex parts 52 and the recess parts 53 in the opposing plate 51, the stiffness of the opposing plate 51 is increased, which makes it possible to reduce the board thickness of the opposing plate 51. Accordingly, it is possible to ensure the strength against a side collision while reducing the weight of the battery-side bracket 5. Further, providing the holes 95 to the convex parts 52 makes it possible to dispose the fastening devices (e.g., the weld bolts 91, the weld nuts 94, and the likes) at a farther distance from the battery pack 4, and thereby, the battery pack 4 can be prevented from deformation and damage that may be caused by a contact with the fastening devices. In particular, if the height H of the head portion 92 of each weld bolt 91 and the thickness T of each weld nut 94 are set shorter than the protruding dimension P of the convex parts 52, the interference between the fastening devices and the battery pack 4 is preferably suppressed. Thus, according to the support device 1 of the present embodiment, it is possible to improve the mountability of the on-board device 10 while enhancing the protectability of the battery pack 4 in a side collision, and also to suppress the weight increase of the support device 1.

Figure 12:
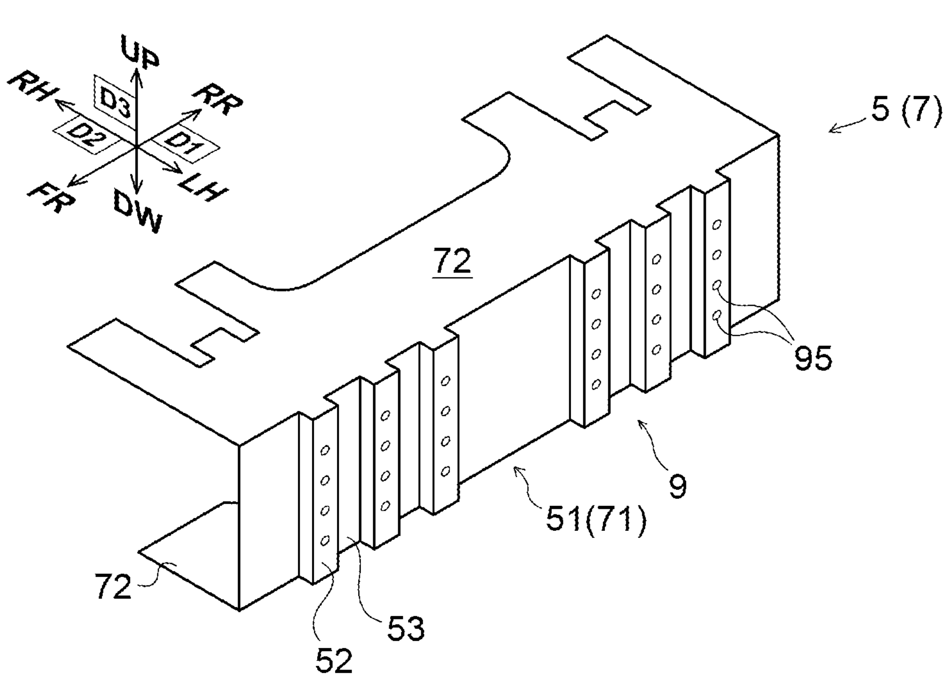
FIG. 12 is a perspective view of an end cross member according to a modification to the second embodiment.
Figure 13:
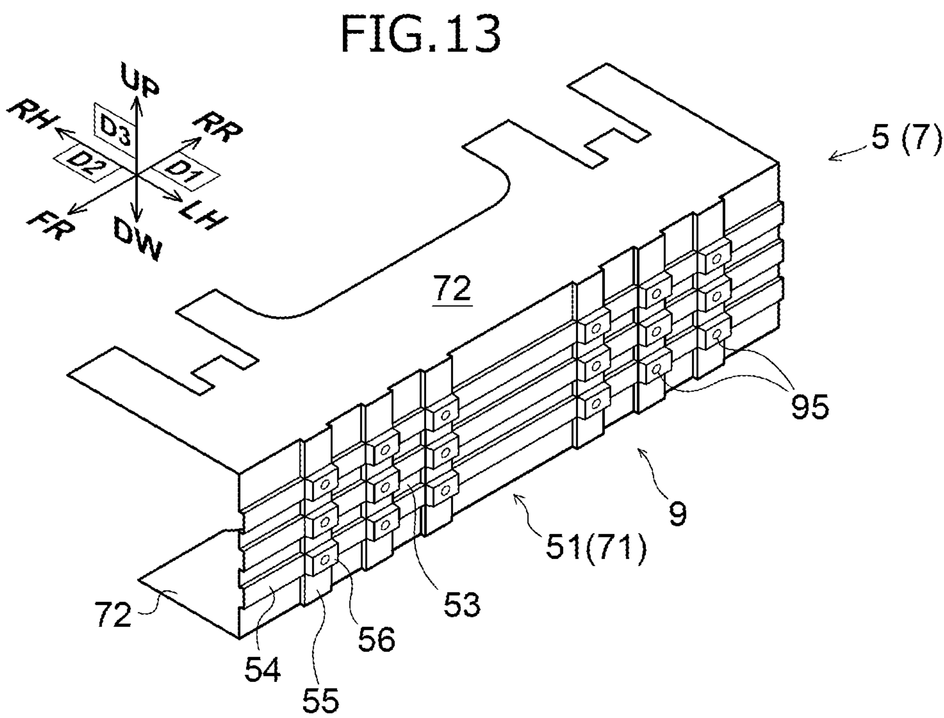
FIG. 13 is a perspective view of an end cross member according to a modification to the second embodiment.

FIGS. 12 and 13 are perspective views showing modifications to the battery-side bracket 5 (end cross member 7). The opposing plate 51 (web portion 71) shown in FIG. 12 has convex parts 52 and recess parts 53 each extending along the vehicle height direction D3. In this example, patterns of a rectangular grid pattern with the holes 95 arranged in three columns in the lateral direction and four rows in the longitudinal direction are arranged at a predetermined interval in the vehicle length direction D1. The multiple holes 95 are arranged to have vertical and horizontal lines of symmetry in a side view. Thus, even when the convex and recess grooves are formed in the longitudinal direction, it is possible to increase the stiffness of the opposing plate 51 and to obtain the same actions and effects as those of the above embodiment.

The opposing plate 51 (web portion 71) shown in FIG. 13 includes, as convex parts protruding outward in the vehicle width direction D2, first convex parts 54 extending in the vehicle length direction D1 and second convex parts 55 extending in the vehicle height direction D3. Further, at the intersections of the first convex parts 54 and the second convex parts 55 in a side view, third convex parts 56 are provided. The parts enclosed by the first convex pars 54 and the second convex parts 55 (the parts not belonging to either first convex parts 54 or the second convex parts 55) are recess parts 53. The multiple holes 95 are formed on, for example, the third convex parts 56 and are arranged to have vertical and horizontal lines of symmetry in a side view. Thus, even when the convex and recess grooves are longitudinally and laterally crossed, it is possible to increase the stiffness of the opposing plate 51 and to obtain the same actions and effects as those of the above embodiment.

4. Third Embodiment

A support device 1 for a vehicular battery pack according to a third embodiment is different from those of the first and second embodiments in the configuration of the opposing plate 51 (web portion 71) of the battery-side bracket 5.

Figure 14:
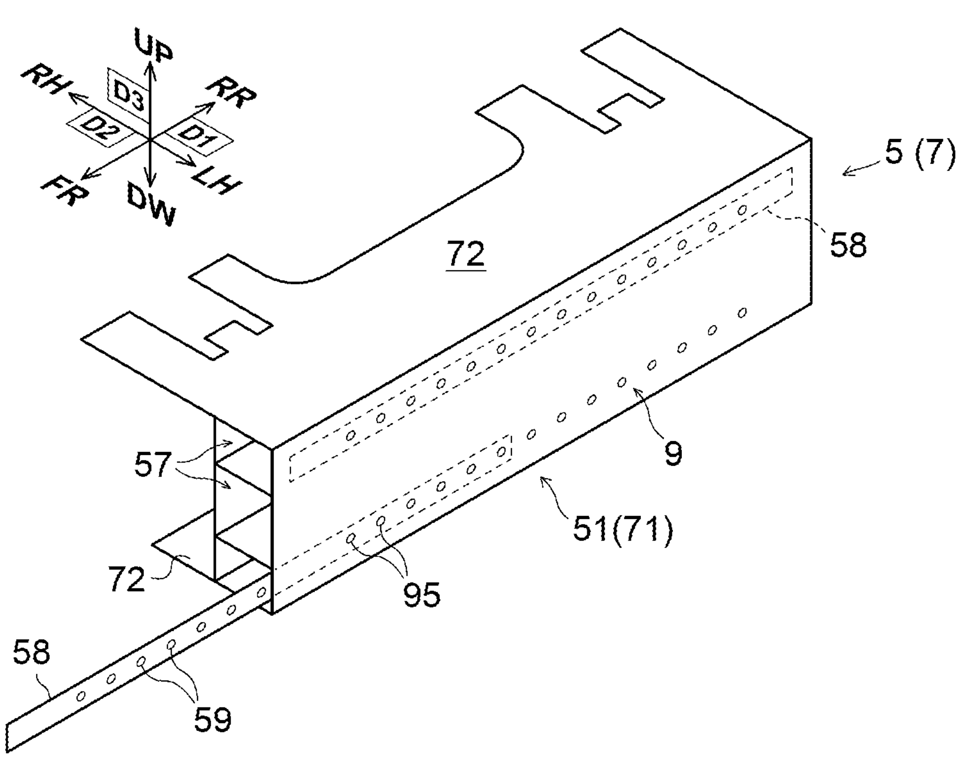
FIG. 14 is a perspective view of an end cross member included in a support device for a vehicular battery pack according to a third embodiment.

As shown in FIG. 14, the opposing plate 51 (web portion 71) is in an extruded shape having hollows 57 therein. These hollows 57 are formed so as to cover the entire outer end in the vehicle width direction D2 of the battery-side bracket 5 (end cross member 7) and function as crushable zones in the event of a side collision. The cross-sectional shape of the peripheral walls surrounding each hollow 57 is preferably a closed cross-sectional shape, and is more preferably a polygonal shape (e.g., rectangle or trapezoid). The extending direction of the hollows 57 (extrusion direction) coincides with the vehicle length direction D1. The number of hollows 57 may be one or more. The composition of the opposing plate 51 is not particularly limited, and may be, for example, an aluminum alloy, a magnesium alloy, steel, ceramics, or a synthetic resin. The opposing plate 51 of the present embodiment is formed of extrusion molding material of an aluminum alloy (aluminum extrusion material) having advantages in the aspects of formability, weight, and cost.

The multiple holes 95 described above are provided so as to penetrate the opposing plate 51 from the hollows 57 to the outside in the vehicle width direction D2. In other words, the multiple holes 95 are drilled into the peripheral wall positioned outside in the vehicle width direction D2 among the peripheral walls surrounding the hollows 57. The on-board device 10, which is attached to the patterned opening unit 9 via the multiple holes 95, is disposed outside in the vehicle width direction D2 of the hollows 57. Consequently, the hollows 57 are disposed between the on-board device 10 and the battery pack 4. Thus, even if external force acts on the on-board device 10 in the event of a side collision, the impact is buffered and absorbed by the deformation of the peripheral walls surrounding the hollows 57, so that the protectability of the battery pack 4 is enhanced.

Inside each hollow 57, a plate 58 may be inserted, to which fastening devices (e.g., the weld bolts 91, the weld nuts 94, and the likes) for mounting the on-board device 10 are fixed. Through each plate 58, multiple plate holes 59 are drilled so as to correspond to the multiple holes 95, and the weld bolts 91 and/or the weld nuts 94 are fixed to the inner side of each plate hole 59. The lateral pitch of the plate holes 59 is set to be the same as the lateral pitch of the holes 95. By inserting the plates 58 into the hollows 57 such that the centers of the plate holes 59 match the centers of the holes 95, it becomes easy to fasten nuts and bolts designed to screw with the weld bolts 91 and the welt nuts 94 fixed to the plates 58.

Figure 15:
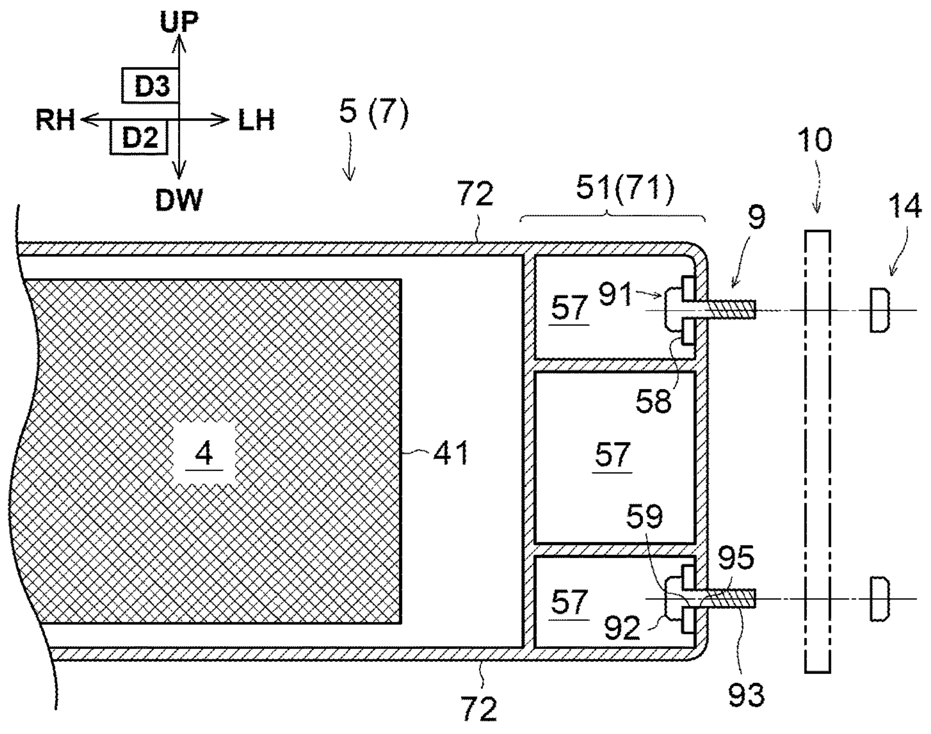
FIG. 15 is a sectional diagram illustrating a manner of attaching an on-board device to the support device of FIG. 14.
Figure 16:
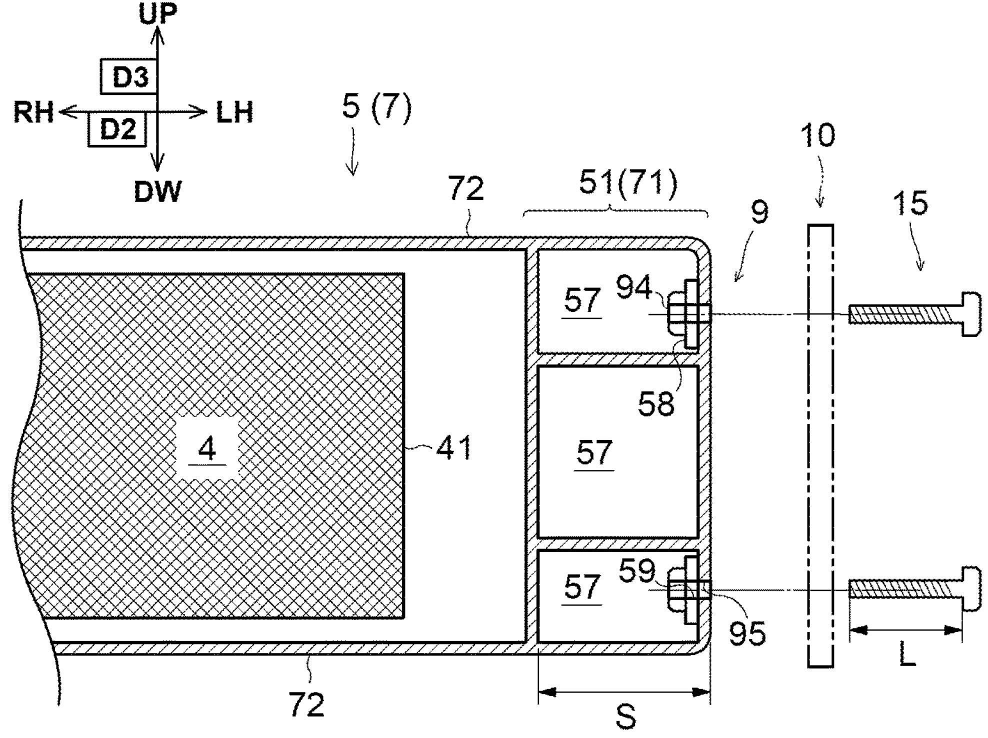
FIG. 16 is a sectional diagram illustrating a manner of attaching an on-board device to the support device of FIG. 14.

As shown in FIGS. 15 and 16, respectively, the patterned opening unit 9 may include the weld bolts 91 and the weld nuts 94 for attaching the on-board device 10 to the battery-side bracket 5 (end cross member 7). FIG. 15 shows the plates 58 fixed with the weld bolts 91, and FIG. 16 shows the plates 58 fixed with the weld nuts 94.

As shown in FIG. 15, each weld bolt 91 has the head portion 92 welded to the plate 58, and the screw portion 93 protruding outward from the head portion 92. Specifically, each of the weld bolts 91 is welded to the plate 58 in a state where the screw portion 93 thereof is inserted from the inside in the vehicle width direction D2 through the plate hole 59. The plate 58 is mounted inside the hollow 57 so that the screw portion 93 is inserted through the hole 95 from the inside in the vehicle width direction D2.

The screw portion 93 of each weld bolt 91 is fastened to the nut 14 after being inserted into a through-hole (not shown) formed on the on-board device 10 (or its bracket or the like). With this configuration, the on-board device 10 is attached to the patterned opening unit 9.

As shown in FIG. 16, each weld nut 94 is welded to the plate 58. Specifically, each weld nut 94 is fixed to the plate 58 while being positioned coaxially with the plate hole 59. Each plate 58 is inserted into the hollow 57 such that the centers of the plate holes 59 and the holes 95 coincide.

Each of the weld nuts 94 is fastened to the bolt 15 inserted from the outside in the vehicle width direction D2 into a through-hole (not shown) formed on the on-board device 10 (or its bracket, for example). Thereby, the on-board device 10 is attached to the patterned opening unit 9 including the weld nuts 94. Incidentally, the bolts 15 fastened to the weld nuts 94 each have a length size L of the screw portion set sufficiently shorter than the inner dimension (gap) S of each hollow 57 ($L<S$).

As described above, with the support device 1 according to the third embodiment, since the opposing plate 51 is made of an aluminum extrusion material having the hollows 57 therein, the weight can be easily reduced as compared with a case where steel is used, and this configuration also exhibits advantages in terms of formability and cost. Further, by providing the multiple holes 95 so as to penetrate the opposing plate 51 from the hollows 57 to the outside in the vehicle width direction D2, the arrangement position of the on-board device 10 is set to the position outside in the vehicle width direction D2 of the hollows 57. This enables the hollows 57 to function as crushable zones in the event of a side collision, so that the initial collision energy can be reduced to avoid the deformation and damage of the battery pack 4. Furthermore, as shown in FIG. 7, when using the bolts 15 having the length size L of the screw portions sufficiently shorter than the inner dimension S of the hollows 57, the interference is prevented between the bolts 15 and the peripheral wall located inside in the vehicle width direction D2 among the peripheral walls surrounding the hollows 57, so that the bolts 15 are inhibited from coming into contact with the battery pack 4. Thus, according to the support device 1 of the present embodiment, it is possible to improve the mountability of the on-board device 10 while enhancing the protectability of the battery pack 4 in a side collision, and to suppress the weight increase of the support device 1.

Figure 17:
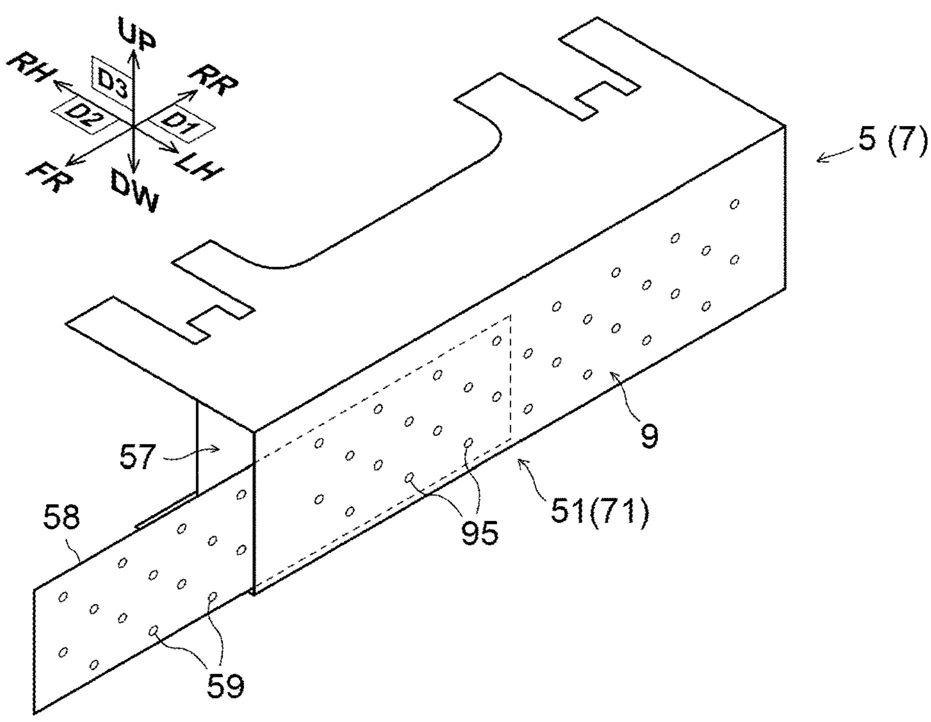
FIG. 17 is a perspective view of an end cross member according to a modification to the third embodiment.
Figure 18:
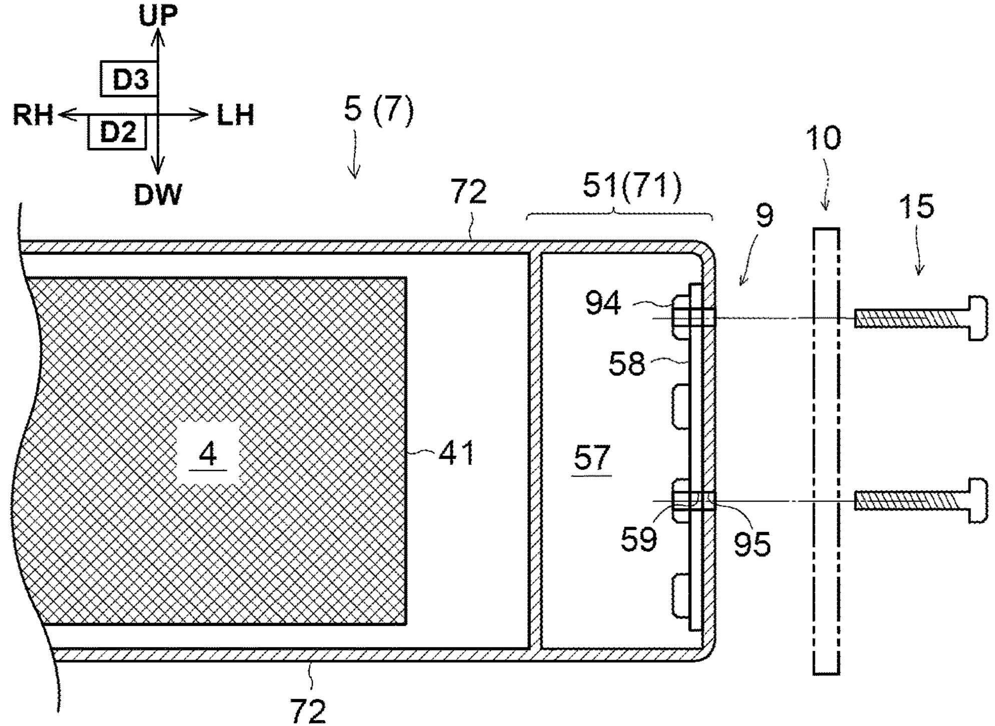
FIG. 18 is a sectional diagram illustrating a manner of attaching an on-board device to the support device of FIG. 17.

FIG. 17 is a perspective view showing a modification to the battery-side bracket 5 (end cross member 7), and FIG. 18 is a cross-sectional view thereof. The opposing plate 51 (web portion 71) shown in FIGS. 17 and 18 is made of an extrusion material having a single hollow 57 therein. The multiple holes 95 are formed on the outer peripheral wall in the vehicle width direction D2 among the peripheral walls surrounding the hollow 57. Further, the plate 58 to be inserted into the hollow 57 is provided with multiple plate holes 59 drilled in the same layout as that of the multiple holes 95. Thus, even if a single hollow 57 and a single plate 58 are provided, the same actions and effects as those of the foregoing embodiments can be obtained.

5. Miscellaneous

The configurations of the battery-side bracket 5 of the first embodiment, the second embodiment, and the third embodiment described above are exemplary. The battery-side bracket 5 only needs to have the opposing plate 51 facing the battery side-face 41 and to have a shape capable of receiving the battery pack 4. The battery-side bracket 5 may be formed of components different from the end cross members 7 and the main brackets 8 described above.

The configuration, the arrangement, and the number of the frame-side brackets 6 are not limited to the above example.

The specific structure of the patterned opening unit 9 is not limited to the above examples. The patterned opening unit 9 may include both the weld bolt 91 and the weld nut 94, or may include a structure except for the weld bolt 91 and the weld nut 94.

The on-board devices 10 to be mounted on the patterned opening unit 9 are not limited to the above casing 12 and the sensor 13, and may alternatively be various devices to be mounted on the electric truck 3. For example, the on-board device 10 may include a low-voltage battery (not shown) for auxiliary equipment of the electric truck 3. Even in cases where the on-board device 10 includes such a low-voltage battery, the support device 1 and the electric truck 3 can ensure the mountability of the on-board device 10 while enhancing the protectability of the battery pack 4 in the event of a side collision, like the above first, second, and third embodiments.

Other examples of the on-board device 10 include a mounting device to be built into the electric truck 3 and an accessory device of the mounting device. Examples of the mounting device include a refrigerating and freezing apparatus, a power generation apparatus, a lighting apparatus, a water supply apparatus, a shredder apparatus, a waste storage apparatus, and a crane apparatus. Examples of the accessory device may include a motor, a compressor, a pump, a wiring material, a plumbing material, and a toolbox. By making the mounting device and/or the accessory device mountable on the battery-side bracket 5, the mounting device and/or the accessory device can be mounted at the substantially same positions as in, for example, an existent vehicle without the vehicular battery pack 4, so that the convenience and usability can be further enhanced.

In an existent vehicle, the mounting device and/or the accessory device have been attached to the side rail 21 via a relatively long bracket. In contrast, in the present embodiments, since the mounting device and/or the accessory device are attached to the opposing plate 51 (web portion 71 of the end cross member 7) of the battery-side bracket 5 located on the outside in the vehicle width direction D2 further than the side rail 21, the bracket can be made shorter than the conventional bracket. Therefore, the bracket can be made compact in size and consequently, the vibration resistance can be improved and the cost can be reduced.

The application target of the support device 1 is not limited to the electric truck 3 as described above. The support device 1 is applicable to various vehicles having a ladder frame 2.

REFERENCE SIGNS LIST

1 support device (support device for battery pack)
2 ladder frame
3 electric truck (vehicle)
4 battery pack (vehicular battery pack)
5 battery-side bracket
6 frame-side bracket
7 end cross member
8 main bracket
9 patterned opening unit
10 on-board device
11 charging opening
12 casing
13 sensor
14 nut
15 bolt
21 side rail
22 cross member
23 web face
24 hole pattern
41 battery side-face
42 front face
43 rear face
51 opposing plate
52 convex part
53 recess part
54 first convex part
55 second convex part
56 third convex part
57 hollow
58 plate
59 plate hole
71 web portion
72 flange portion
81 web portion
82 flange portion
91 weld bolt
92 head portion
93 screw portion
94 weld nut
95 hole

The invention claimed is:

1. A support device for a vehicular battery pack that is mounted under side rails constituting a ladder frame of a vehicle and that includes a pair of battery side-faces each of which faces outward in a vehicle width direction and is located outside in the vehicle width direction further than the side rails, the support device comprising:

a battery-side bracket that includes an opposing plate facing one of the battery side-faces and receives the vehicular battery pack;

a frame-side bracket that couples the battery-side bracket to one of the side rails; and a patterned opening unit that is provided with a plurality of holes formed on the opposing plate of the battery-side bracket and mounts an on-board device on the battery-side bracket via at least one of the plurality of holes, the plurality of holes being arranged in a predetermined pattern;

wherein:

one of the side rails has a hole pattern formed on a web face;

an arrangement of the plurality of holes corresponds to the hole pattern; and the arrangement of the plurality of holes corresponds to the hole pattern formed on a portion of the web face of the side rail, the portion being located vertically above the vehicular battery pack.

2. A support device for a vehicular battery pack that is mounted under side rails constituting a ladder frame of a vehicle and that includes a pair of battery side-faces each of which faces outward in a vehicle width direction and is located outside in the vehicle width direction further than the side rails, the support device comprising:

a battery-side bracket that includes an opposing plate facing one of the battery side-faces and receives the vehicular battery pack;

a frame-side bracket that couples the battery-side bracket to one of the side rails; and a patterned opening unit that is provided with a plurality of holes formed on the opposing plate of the battery-side bracket and mounts an on-board device on the battery-side bracket via at least one of the plurality of holes, the plurality of holes being arranged in a predetermined pattern;

wherein the opposing plate is formed into a wavy shape by alternately arranging a convex part and a recess part, the convex part protruding outward in the vehicle width direction and having the plurality of holes formed therethrough, the recess part being located inside in the vehicle width direction from the convex part.

3. A support device for a vehicular battery pack that is mounted under side rails constituting a ladder frame of a vehicle and that includes a pair of battery side-faces each of which faces outward in a vehicle width direction and is located outside in the vehicle width direction further than the side rails, the support device comprising:

a battery-side bracket that includes an opposing plate facing one of the battery side-faces and receives the vehicular battery pack;

a frame-side bracket that couples the battery-side bracket to one of the side rails; and a patterned opening unit that is provided with a plurality of holes formed on the opposing plate of the battery-side bracket and mounts an on-board device on the battery-side bracket via at least one of the plurality of holes, the plurality of holes being arranged in a predetermined pattern;

wherein:

the opposing plate is an extrusion material including a hollow extending in a vehicle length direction; and the plurality of holes is provided so as to penetrate the opposing plate from the hollow to an outside in the vehicle width direction.

4. An electric truck, comprising;

a support device for a vehicular battery pack that is mounted under side rails constituting a ladder frame of a vehicle and that includes a pair of battery side-faces each of which faces outward in a vehicle width direction and is located outside in the vehicle width direction further than the side rails, the support device comprising:

a battery-side bracket that includes an opposing plate facing one of the battery side-faces and receives the vehicular battery pack;

a frame-side bracket that couples the battery-side bracket to one of the side rails; and a patterned opening unit that is provided with a plurality of holes formed on the opposing plate of the battery-side bracket and mounts an on-board device on the battery-side bracket via at least one of the plurality of holes, the plurality of holes being arranged in a predetermined pattern;

wherein the on-board device is mounted on a surface outside in the vehicle width direction of the opposing plate and comprises a sensor that detects an object located outside in the vehicle width direction of the electric truck.

* * * * *